United States Patent [19]

Miller, Jr. et al.

[11] 4,070,550
[45] Jan. 24, 1978

[54] QUANTIZED PULSE MODULATED NONSYNCHRONOUS CLIPPED SPEECH MULTI-CHANNEL CODED COMMUNICATION SYSTEM

[75] Inventors: Ralph H. Miller, Jr.; William W. Dyer, both of La Mesa; John A. Waterbury, San Diego; Wayland A. Carlson, San Diego; Richard O. Eastman, San Diego, all of Calif.

[73] Assignee: The United States of America as represented by the Secretary of the Navy, Washington, D.C.

[21] Appl. No.: 122,056

[22] Filed: June 28, 1961

[51] Int. Cl.$^2$ .............................................. H04J 3/00
[52] U.S. Cl. .................................................. 179/15 BA
[58] Field of Search ................................... 325/38–40; 179/15 BA

[56] References Cited

U.S. PATENT DOCUMENTS

| | | | |
|---|---|---|---|
| 2,949,503 | 8/1960 | Andrews | 179/15 BS |
| 2,962,553 | 11/1960 | Halina | 179/15.6 |
| 2,974,281 | 3/1961 | Feldman | 179/15.6 |
| 2,974,285 | 3/1961 | Schenck | 328/91 |
| 3,005,160 | 10/1961 | Newberry et al. | 328/91 |

*Primary Examiner*—Howard A. Birmiel
*Attorney, Agent, or Firm*—Richard S. Sciascia; Paul N. Critchlow; Roy Miller

EXEMPLARY CLAIM

1. A quantized pulse-modulated nonsynchronous clipped speech multi-channel coded communication system comprising transmitter terminals and receiver terminals; said transmitter terminals comprising a plurality of channel units, a timing unit, and a transmitting unit; said channel unit including processing section, encoding section and pulse position modulating section; said processing section including input means for coupling a composite waveform thereto, pre-emphasis means operatively receiving said composite waveform for accentuating crossover points in the composite waveform, clipping means operatively receiving the output of said pre-emphasis means for infinitely clipping the amplitude portion of said composite waveform and retaining the frequency information therein, pulse generating means operatively coupled to the output of said clipping means for generating pulses corresponding to said crossover points; gate generator means contained within said encoding section and operatively coupled to the output of said pulse generating means for generating gate pulses; buffer circuit means contained within said timing unit operatively connected to the output of said gate generator means for isolating the outputs of said plurality of channel units, sampling means for sampling the outputs of said channel units fed to said buffer circuit means, first coincidence circuit means operatively receiving the output of said buffer circuit means and said sampling means for generating an output pulse when pulses from said summing circuit and said sampling means are coincident therein, channel coding means comprising a delay line operatively receiving pulses from said coincidence circuit means for generating start stop and a plurality of channel pulses corresponding to the number of channel units; second coincidence circuit means operatively receiving pulses from said gate generating means and pulses from said delay line corresponding to the appropriate channel unit for generating an output pulse when pulses from said gate generator and said delay line are coincident therein, blocking oscillator means operatively receiving pulses from the output of said second coincidence circuit means for generating first output pulse which is operatively coupled to said gate generator means for turning off said gate generating means and generating a second pulse; comparator means in said pulse position modulator section and operatively receiving the second output pulse from said blocking oscillator and receiving a signal corresponding to said composite waveform and time modulating said second output pulse from said blocking oscillator wherein the modulation corresponds to the amplitude information of the input waveform; other buffer circuit means contained within said transmitting unit for receiving start-stop pulses from said delay line and time modulated channel pulses from said comparator means wherein said channel pulses are contained between said start-stop pulses, and propagating means operatively receiving the output trains of pulses from said other buffer circuit means for propagating said trains of pulses; said receiver terminal comprising a receiver unit for receiving and detecting trains of pulses; master decoder means operatively receiving trains of pulses from said receiver unit for separating incoming trains of pulses into channels and for generating a time reference pulse; at least one channel decoder means including coincidence means operatively receiving pulses from said master decoder means for determining the presence of information on a particular channel by comparing said reference pulse to individual channel pulses in the coincidence means; at least one reprocessing means operatively receiving pulses from said channel decoder means for converting information applying to a particular channel from pulses to a reproduction of the originating signals; each reprocessing unit including pulse position demodulator means operatively receiving pulses from said channel decoder means for converting time modulation information to a DC voltage which is proportional to the amplitude information; a clipped speech section contained within said audio reprocessing means operatively receiving output pulses from said channel decoder means for recovering the frequency information contained therein; variable amplifier means operatively receiving amplitude information from said pulse position demodulator means and audio frequency information from said clipped speech means for combining said amplitude information and said frequency information thereby improving the naturalness of the output speech and audio output means operatively receiving the output of said variable amplifier means for reproducing said output waveform from said variable amplifier means.

10 Claims, 9 Drawing Figures

INVENTORS
RALPH H. MILLER
WILLIAM W. DYER
WAYLAND A. CARLSON
BY RICHARD O. EASTMAN
JOHN A. WATERBURY

ATTORNEYS

QUANTIZED PULSE MODULATED NONSYNCHRONOUS CLIPPED SPEECH MULTI-CHANNEL CODED COMMUNICATION SYSTEM

The invention described herein may be manufactured and used by or for the Government of the United States of America for governmental purposes without the payment of any royalties thereon or therefor.

The present invention relates to a communications system and more particularly to a quantized pulse modulated non-synchronous clipped speech multi-channel coded communications system providing intelligibility and adequate naturalness of speech.

The present invention constitutes an improved version of copending application Ser. No. 106,413, filed Apr. 27, 1961, Random Transmission Clipped Speech Coded Communications System, and copending application Ser. No. 107591 filing date May 3, 1961, Quantized Nonsynchronous Clipped Speech Multi-Channel Coded Communication System, and also provides significant improvements over the pulse modulated multiplex systems in existence at the present time. The present system is intended to provide a communications system which can handle a multiplicity of channels on a multiplex basis and, in addition, be capable of operating through heavy interference and jamming.

In conducting studies of various types of existing multiplexing systems and equipments to determine if any of the existing systems and equipments gave satisfactory communications through heavy interference and jamming it was discovered that a serious problem was presented because of the synchronization signals necessary between unit stations. Therefore, if the synchronization signal was jammed or blocked, the system became useless; hence, high-power rf links were necessary but even with the use of high-power rf links the system was not foolproof. With the above difficulties in mind, a pulse system was devised corresponding to copending application entitled Random Transmission Clipped Speech Coded Communications System, hereinafter referred to as Clipco One.

Clipco I utilizes multiplexing and provides nonsynchronous transmission between any of the stations, and it offered the advantage that, if none of the channels of the system were in operation, no rf energy was radiated. However, it was discovered that although intelligibility was fair in the system, interchannel interference was quite noticeable. This lead to the development of another system disclosed in copending application Quantized Nonsynchronous Clipped Speech Multi-Channel Coded Communication System, hereinafter referred to as Clipco Two, wherein the channel pulses corresponding to the number of channels desired are contained or multiplexed between common start and stop pulses. Through the use of such a technique the average power output is further reduced and, in addition, reduces interchannel garbling to a minimum.

The Clipco I and Clipco II systems utilize an infinite clipping technique wherein the amplitude component of speech is removed and only the frequency component is left to transmit the intelligible portion of a composite waveform. In such a technique, speech is passed through a high-pass filter or pre-emphasis network, then heavily peak-clipped which removes the amplitude component, amplified, and the resulting "rectangular" wave differentiated and rectified. This produces a spike at the beginning and end of each speech frequency which may be transmitted as a high-power short-duration pulse of energy. At a receiver terminal the pulses may be used to turn on and off a flip-flop multivibrator whose output may then be integrated to form a reasonable facsimile of the original speech waveform.

Multiplexing is added to this type of pulse communication by the use of channeling codes. For example, instead of transmitting a single pulse on the upward swing of the rectangular intelligence wave for the control of the flip-flop circuit, the pulse is inserted at its assigned time-position between two fixed framing or start-stop pulses and the resulting three-pulse train is transmitted. The receiver then recognizes the time-position as being assigned to a specific channel and decodes the train to a single pulse to actuate a corresponding flip-flop in that channel. The spacing between framing pulses is designed to accommodate a desired number of time positions or channels.

In Clipco I the different channel codes are transmitted randomly as the coded trains of pulses from each channel appear at the transmitter. In Clipco II, as previously stated, all channels are transmitted between common framing pulses as they are present rather than at random time intervals.

The resulting speech in Clipco I and Clipco II is reasonably intelligible, i.e., contains all of the information necessary due to the fact that the frequency component is retained, but contains certain undesirable effects therein in that the speech sound is very crisp and sharp due to the over-emphasis of the consonants in respect to the vowels which is caused by the pre-emphasis circuitry. Additionally, the speech shows a burst effect, rather than the gradual build up experience in normal speech. This is caused by the squelch circuit characteristics of the regenerative amplifier and is due to the sudden transitions between signal and no signal. Further, the speech is noisy due to the modulation of small-amplitude speech sounds by ambient and circuit noise in that the clipping causes all inputs to come out at the same amplitude. Therefore, a small noise will cause the same effect as a small speech input; and a good signal-to-noise ratio and low noise circuits become extremely important.

The above characteristics of the clipped speech combined to give it an unnatural sound which makes it very fatiguing to listen to over long periods of time. Consequently, it was decided that the reconstruction of speech from its frequency component alone would be benefited and that naturalness would be improved if amplitude information were added to infinitely clipped speech. Therefore, the present invention is directed to a system wherein frequency information is utilized to generate a pulse output and, in addition, where the amplitude information is utilized to time modulate the output pulse corresponding to the frequency information in its respective channel.

Therefore, an object of the present invention is to provide a jam resistant communications system which will operate through heavy interference.

A further object of the invention is to provide a pulse modulated communications system wherein pulses are generated corresponding to the crossover points in the input wave.

Another object of the present invention is to provide a pulse modulated communications system wherein the pulse is time modulated in accordance with amplitude information in the input wave.

A further object of the invention is to provide a quantized pulse modulated nonsynchronous clipped speech multi-channel coded communications system.

A further object of the present invention is to provide a pulse modulated multiplexed system for transmitting and reproducing natural sounding speech.

A further object of the invention is to provide a nonsynchronous multipulse time modulated channel coded communications system.

Another object of the present invention is to provide a nonsynchronous multiplexed communications system with a low duty cycle.

A further object of the present invention is to provide a multiplexed pulse modulated communications system for transmitting and receiving information between a multiplicity of stations.

A further object of the invention is to provide a novel communications network capable of addressing a communication to desired stations.

Another object of the invention is to provide a quantized pulse modulated nonsynchronous clipped speech multi-channel coded communications transmitter.

Another object of the invention is to provide a coded communications receiver.

A further object of the invention is to provide a novel time modulation circuit.

An additional object of the invention is to provide a novel pulse position demodulator.

A further object is to provide a system wherein amplitude sampling is nearly optimum and is determined by the pulses generated at the zero crossover points of an input waveform.

Various other objects and advantages will appear from the following description of the invention, and the novel features will be particularly pointed out hereinafter in connection with the appended claims.

The above objects and advantages of the present invention are achieved through the use of a system wherein pulses are generated at the zero crossover points of input wave forms of the channels in a multichannel system. The pulses corresponding to the crossover points, are then encoded and inserted into particular time slots corresponding to the appropriate channels as determined by a timing unit. In the present embodiment the code is a three pulse code comprising start-stop and channel pulses. Amplitude information is then imparted to the channel pulse through the use of a pulse position modulator wherein the channel pulse is shifted with respect to time in accordance to the amplitude information in the input wave. The trains of pulses from the various channels are then propagated into space and received on a receiver terminal wherein the trains of pulses are detected and sent to coincidence circuits corresponding to the number of channels. In the coincidence circuit, the start-stop and channel pulses produce a single output pulse in the correct channel which is sent through a pulse position demodulator section to obtain amplitude information. The same output pulse from the coincidence circuit is also sent through a clipped speech section wherein frequency information is obtained. The amplitude information and frequency information are then mixed thereby providing a reasonable facsimile of the original input composite waveform.

Reference is now made to the following description taken in conjunction with the accompanying drawings wherein.

The system will now be described in conjunction with the drawings wherein like numerals indicate like parts.

Figure 2:
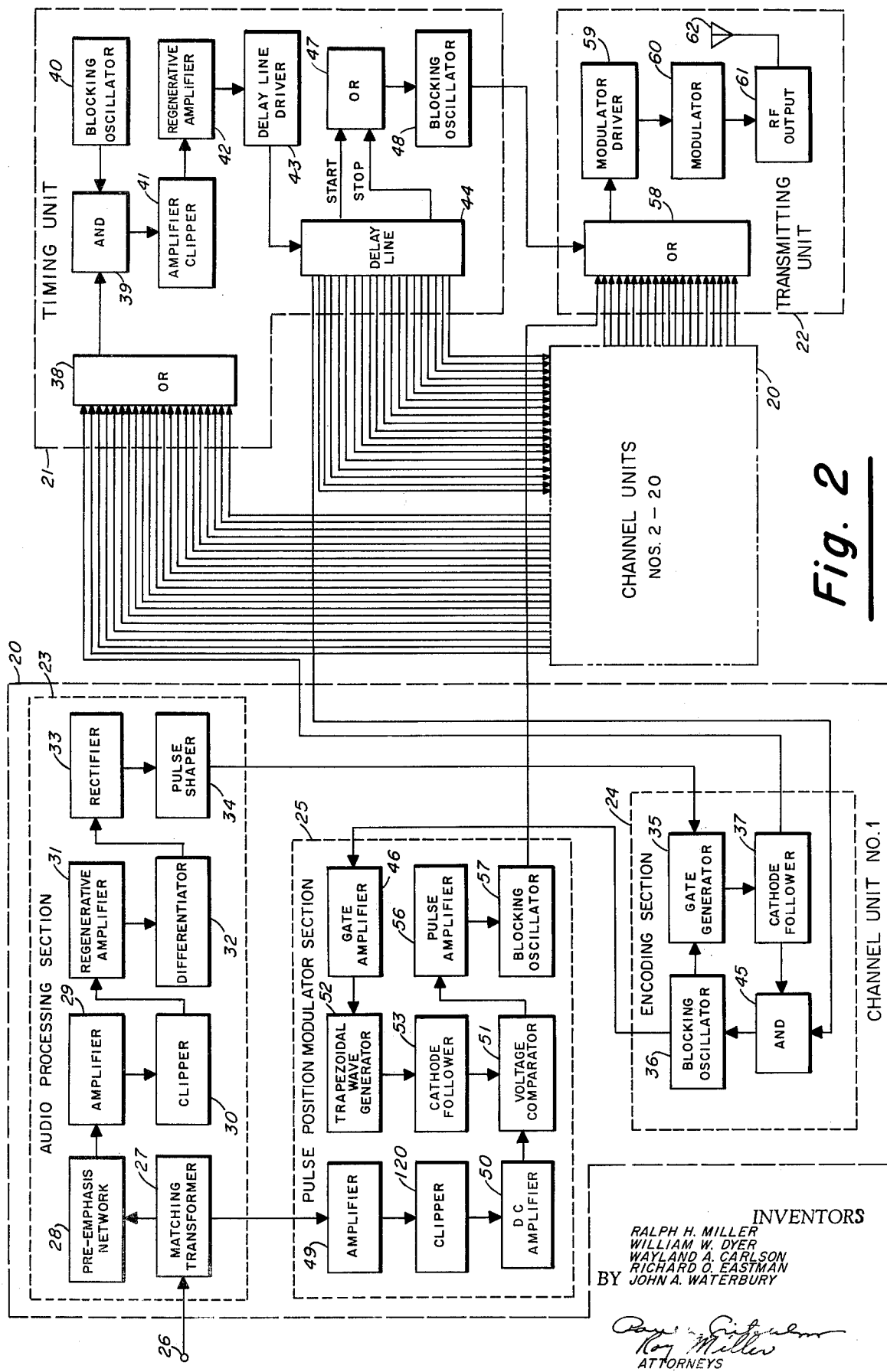
FIG. 2 is a simplified transmitter assembly block diagram.

FIG. 2 shows the transmitter assembly in the form of a simplified block diagram. The transmitter assembly comprises a multiplicity of channel units 20, a timing unit 21 and a transmitting unit 22. Each of the channel units 20 is further broken down into an audio processing section 23, encoding section 24, and pulse position modulator section 25. The audio processing section 23 converts information within the audible spectrum to pulses, the pulses being generated at the crossover points of the input waveform.

A number of different types of inputs may be used, for example, speech, facsimile, or teletype. The present disclosure is made with reference to speech in that speech is the most difficult to implement. Speech signals may be used directly in the disclosed system while facsimile and teletype would require the use of converters. However, the use of such converter is quite old, no description or showing is made of the same as being novel.

In that the present system utilizes a clipping technique it is believed desireable to discuss some of the characteristics of speech. Speech sounds are formed by the acoustic excitation of the vocal tract. This excitation may consist of periodic pressure waves generated at the larynx or turbulance generated at some point of constriction along the vocal tract. The frequency of larynx vibration establishes the pitched frequency which may lie anywhere between 100 and 400 cycles per second, depending on the physical characteristics of the speaker, i.e., a woman's voice would be pitched higher than a man's voice. The vocal cabity transmission characteristic acting on the larynx signal causes certain harmonics of the pitch frequency to pass with less attenuation than others. This may be best illustrated by the spectral energy distribution of voice sounds shown in FIG. 4. The pitch frequency and its harmonics are represented by the vertical lines while the broader peaks of energy, called formants, result from the influence of the transmission characteristics of the vocal cavity. Most of the significant information content of a speech wave is contained in a frequency region covered by the first three formants in the dynamic amplitude range from plus 12 to minus 28 db around an average level which is primarily determined by the speaker's natural characteristics and his surroundings. The speaker's animation and recognition, or voice quality, is due mainly to the voiced character and inflection of the peak pitch spectrum which goes considerably beyond the first three frequency formants and to an amplitude range of 60 db.

Figure 4:
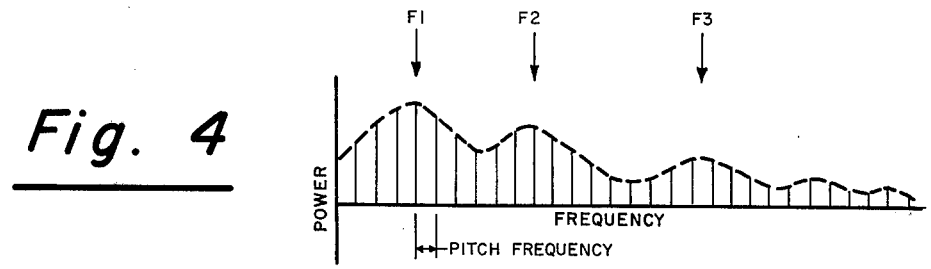
FIG. 4 is a diagram showing spectral distribution of voiced speech signal energy.

When two or more frequency signals are present simultaneously in a composite waveform, the weaker signals are suppressed if the signal undergoes extreme clipping. Since, as shown in FIG. 4, the power or amplitude of either formant two or three is less than that of formant one, severe clipping may eliminate intelligence contained in formants two and three as well as higher formants unless amplitude compensation is added.

It is been shown that the average speech power spectrum has a falling characteristic of approximately 9 db per octave from 500 cycles to 4 kilocycles. Therefore, a pre-emphasis network having a rising frequency characteristic of approximately 9 db per octave through the same frequency range can provide the necessary compensation.

Figure 5:
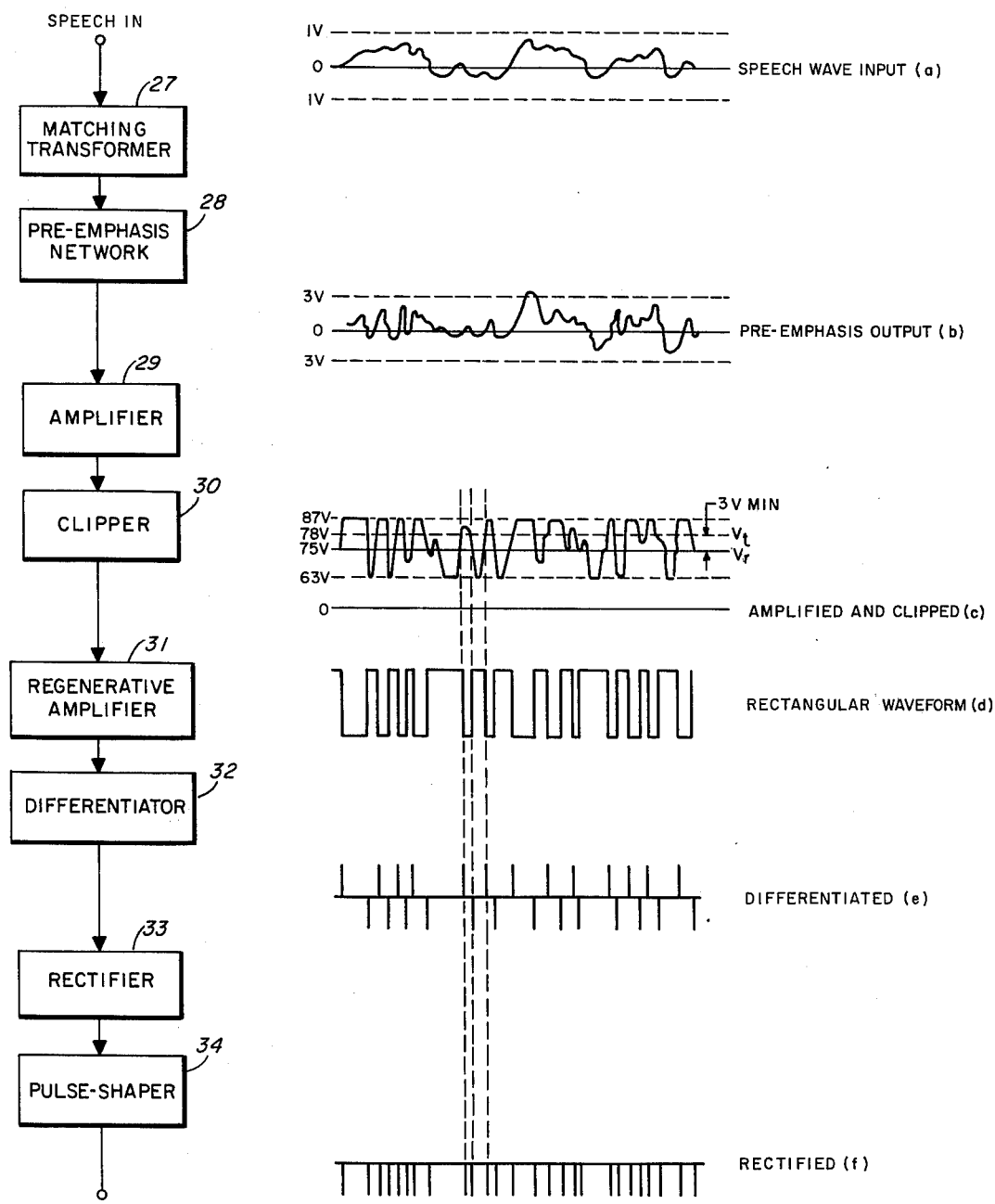
FIG. 5 is a diagram showing waveforms present at various points in the audio processing section.

Thusly, in FIG. 2, a signal coupled to input 26 is introduced into a matching transformer 27 and thence to a pre-emphasis network 28 having the aforesaid rising frequency characteristic of approximately 9 db per octave through the frequency range of 500 cycles to 4 kilocycles. In that the output waveform from the pre-emphasis network 28 has been compensated thereby equalizing the amplitudes of the first three formants prior to extreme clipping, the information content of the higher formants is retained. FIG. 5(b) shows the output of the pre-emphasis network as compared to the original speech wave at point 26 wherein it can be seen that many more crossover points now appear than were apparent in the original speech wave.

The output waveform of FIG. 5(b) is coupled to an amplifier 29 and clipper 30. When clipping a waveform of varying amplitude, the smallest signal to be clipped determines the clipping level. If the clipping level is fixed, then the smallest signal determines the amount of amplification necessary prior to clipping and since the major information content of speech signals is contained in a dynamic range of 40 db, the minimum amplification required is 40 db. In that the average level of speech also varies, another 20 db of gain is added giving a total gain of 60 db prior to infinite clipping. This amplification is obtained by the use of the amplifier 29 which is a conventional resistance coupled amplifier. Additional amplification is obtained in the clipper 30 consisting of two conventional cathode coupled symmetrical clipper amplifiers. By using the amplifier clipping circuitry set forth the recovery time of the circuits after clipping is determined only by the signal input and a symmetrical output may be obtained. In addition, positive feedback is used thereby improving steepness of the leading and lagging edges of the waveform and the circuits utilized have high input and output impedances which facilitate clipping. The use of the two cathode coupled symmetrical clipper amplifiers also reduces the number of tubes and components as compared with other types of amplifier clippers and circuit noise is minimized. The waveform as shown in FIG. 5(c) corresponds to the output of the clipper 30.

As stated previously, a speech wave may experience extreme clipping following pre-emphasis while losing only a small percentage of the intelligence contained therein. However, to achieve this, a large degree of amplification is necessary and this amplification is applied not only to the speech, but also inevitably to the noise that occur between words. Therefore, if a pulse were generated for every amplitude transition, whether it be speech or noise, a very noisy, inefficient and high-duty-cycle system would result therefrom. Thusly, it is desired that circuit generated noise be reduced as much as practicable and since it is desired only to generate pulses corresponding to the frequency components of speech, some form of noise suppression is necessary.

Regenerative amplifier 31 fulfills this function by acting as a base clipper to suppress more noise than signal. Base clipping can be best understood by referring to FIG. 5(c) which also shows the results of the peak clipping in the previous stages. The trip level, $V_t$ of the regenerative amplifier is a fixed potential. The reference or quiescence level, $V_r$ is an adjustable potential which is set so that the majority of the system noise peaks will not exceed $V_t$. In operation, a regenerative amplifier is essentially a bistable device. The audio signals vary about $V_r$, and when they reach $V_t$ they trigger the regenerative amplifier to the "on" stage and when they return to $V_r$, they trigger it to the "off" state. As a result a series of rectangular waveforms are generated corresponding to FIG. 5(d). The widths of the waveforms are determined by the frequency of audio transitions about $V_t$. Hence, the output waveforms contain primarily the frequency information of the originating audio signal. The output signals also contain some amplitude information in the form of a frequency shift due to the finite rise and fall time of the audio wave and the difference between $V_t$ and $V_r$. However, for all practical purposes the audio signal has been infinitely clipped, i.e., amplitude variations removed at this point. In the present invention, the minimum trip level of the regenerative amplifier, as determined by circuit noise is three volts which is the difference between $V_t$ and $V_r$. Referring this sensitivity to the input, at a frequency of one kilocycle per second the signal needs a peak amplitude of 0.0015 volts to trip the regenative amplifier. Additionally, the $V_t - V_r$ level may be adjusted as various factors change in the system however, once set is maintained.

The rectangular waveform corresponding to FIG. 5(e) is then coupled to a differentiator wherein pulses are generated corresponding to the crossover points of the square wave as shown in FIG. 5(e).

From FIG. 5(e), it is seen that when the rectangular waveform is differentiated, positive and negative pulses are generated. To utilize these pulses in a subsequent system, they must be unidirectional; hence, the differentiator output is rectified in rectifier 33. The rectified pulses are then fed to a pulse shaper 34 consisting of a pulse amplifier, blocking oscillator driver, and blocking oscillator, none of which are shown. The pulse shaping circuitry 34 assures that the output pulses have constant pulse width and amplitude and the output waveform therefrom is shown in FIG. 5(f). The output pulses from the pulse shaping circuitry are negative pulses, 0.5 microseconds in width and having a peak amplitude of 70 volts.

Reference is now made to an encoding section 24 and the timing unit 21 to illustrate how the many channels are propagated over a common medium by allocating different time intervals for the transmission of each channel utilizing time-division multiplexing. The encoding section and timing unit combined to perform the functions of generating and allocating the timing information. Timing unit 21 generates clock or synchronizing pulses at appropriate time intervals while the appropriate encoding sections select appropriate synchronizing pulses corresponding to their respective channels. A typical sequence of events for three audio processors encoder sections and the timing unit shown in FIG. 6 which will be explained in detail below.

Figure 6:
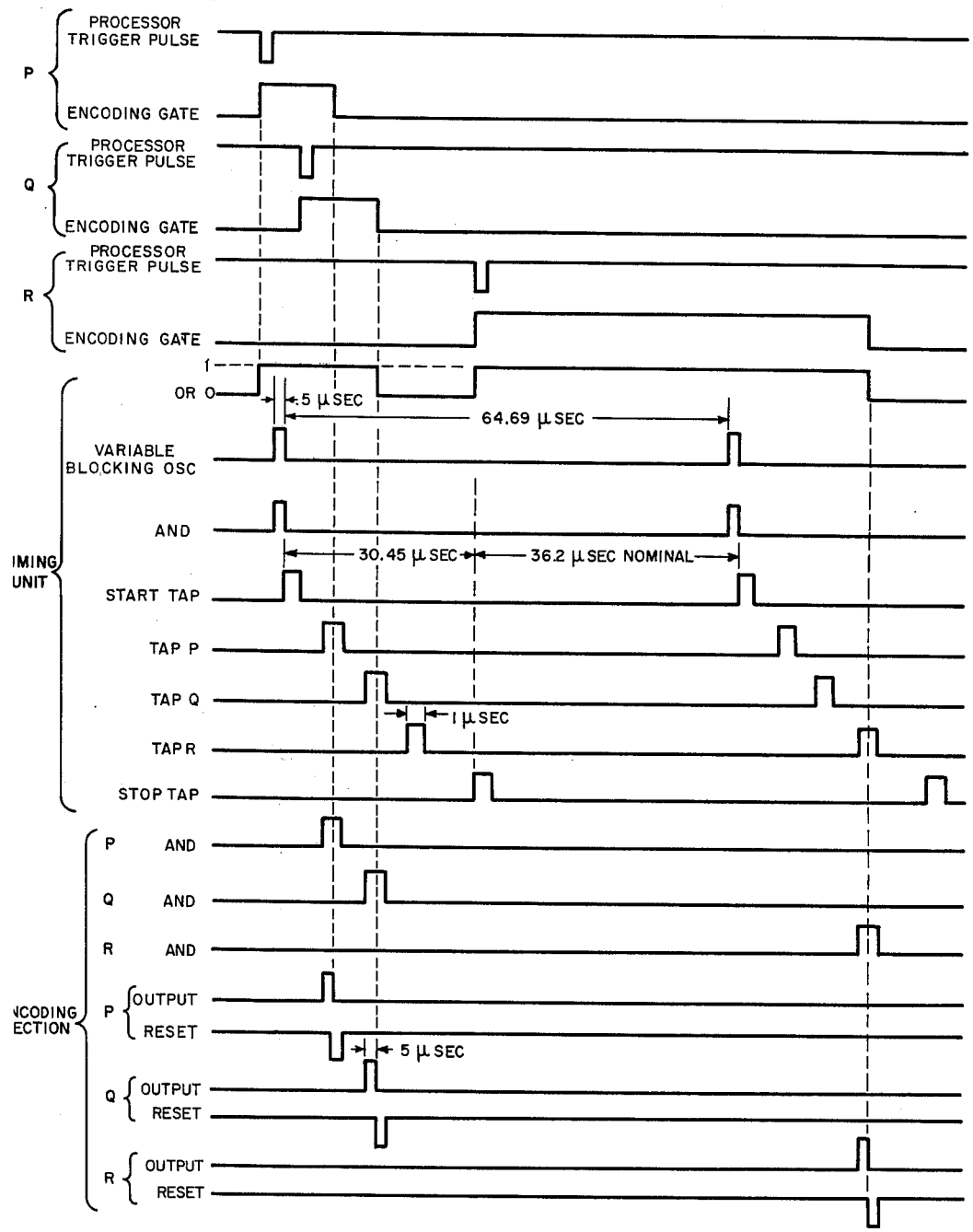
FIG. 6 is a generalized timing diagram for three encoder sections and one timing unit.

The negative pulses from the audio processing section trigger a gate generator 35 in the encoding section 24. The gate generator is a flip-flop having a preferred state which provides a positive output gate pulse when triggered. The termination of the gate will be explained in the discussion of a blocking oscillator 36. The gate generator 35 is isolated by cathode follower 37 and activates the timing unit 21. Outputs from processor sections P-Q-R and their corresponding encoding section gates are shown in FIG. 6. The output of OR circuit 38 has two fixed levels representing either a zero or a one. The zero (0) level represents the case of no information on any of the channels, whereas a one (1) signifies that at least one channel has generated a gate. The output of OR circuit 38 is one input to a coincidence circuit or And gate 39. The other input to the And gate 39 is from a variable blocking oscillator 40 which randomly samples the state of the OR output. If OR 38 is in state one, then a single pulse is coupled to a clipper amplifier 41.

The output of blocking oscillator 40 is a series of 0.5 microsecond pulses at a frequency of approximately 15 kilocycles per second which is determined by the grid circuit RC time constant. In determining the frequency to be used as the sampling rate the following factors were considered.

The highest audio frequency that needs to be processed is 3500 cycles per second. This corresponds to a maximum pulse rate of 7 kilocycles per second, 2 pulses for each period, to be sampled by the blocking oscillator. To ensure that this maximum information rate is transferred, it must be sampled at a rate that is greater than twice 7 kilocycles per second; hence, the minimum rate of blocking oscillator 40 is 14 kilocycles per second.

The maximum sampling rate is limited by the length of the delay line, which is 30.1 microseconds long, of the receiver in that two separate transmitted pulse trains cannot be in the delay line, at the same time. Hence, the maximum period must be 16.2 microseconds or a maximum sampling rate of 16.6 kiloseconds per second.

In that the maximum and minimum rates are not the same a compromize between the rates was chosen at 15 kilocycles per second. In addition, to minimize the effects of some types of jamming it is desireable that the sampling rate vary somewhat around the nominal value. The blocking oscillator circuit configuration used in the equipment, therefore, is designed to provide a frequency of 15 kilocycles which has a variation of plus or minus 4 percent. This variation is well within the limits previously discussed and allows adequate guard bands at either end. The resultant output of blocking oscillator 40 is a sampling rate varying between 14.4 and 15.6 kilocycles per second.

The output pulses from coincidence circuit 39 are coupled to amplifier clipper 41, which is a base clipper. Since there are some base line variations in the output of the And circuit 39, the signal is base-clipped to remove the possibility of false triggering of a subsequent delay line driver stage 43. The output of clipper amplifier 41 is coupled to a regenerative amplifier 42 which is used to generate trigger pulses. Contained within regenerative amplifier 42 is a cathode follower, not shown, which provides adequate and uniform trigger pulses to the delay line driver 43 at low impedance. The delay line driver supplies a low impedance, one-microsecond pulse to a delay line 44. By matching the output impedance of the driver 43 to the characteristic impedance of the delay line 44, multiple reflections in the delay line are minimized. A large-amplitude pulse is required to drive the delay line to compensate for its attenuation and still provide a useable signal at its end; hence, a need for a delay line driver.

Figure 1:
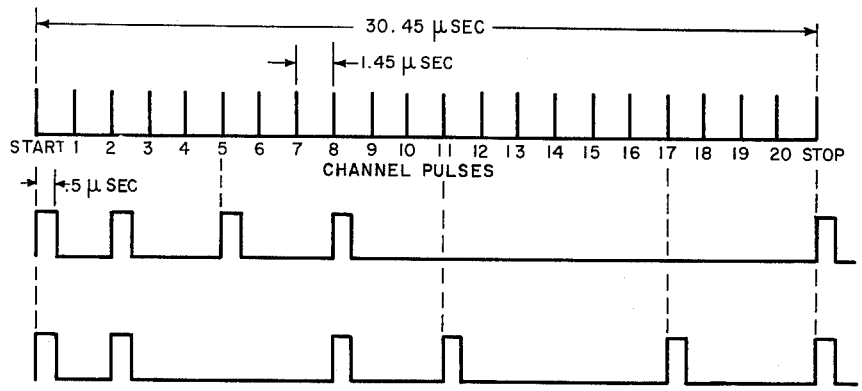
FIG. 1 is a diagram of channel spacing and typical train configurations for two channels.

The purpose of the lumped parameter delay line 44 is to generate sequential pulses corresponding to individual channels, all in accurate time-relation to each other and to the trigger or synchronizing pulse. Upon receiving a trigger pulse from the delay line driver, two framing pulses and 20 channel pulses are generated by the delay line as shown at the top of FIG. 1. The first tap on the delay line is at 0.5 microseconds which corresponds to the start pulse. The second tap is at 1.45 microseconds and corresponds to channel one. The remaining taps are spaced at intervals of 1.45 microseconds except for the last tap. The last tap, corresponding to the stop pulse, is spaced 1.95 microseconds from channel 20. the total length of the delay line is, therefore, 30.95 microseconds. The reason for the odd spacings on the start-stop taps is to compensate for the delays encountered by the channel pulses in the subsequent pulse position modulator section 25. The resulting train out of the delay line consists of a start and stop pulse 30.45 microseconds apart, enclosing 20 channel pulses 1.45 microseconds apart. At the 15 kilocycle per second sampling rate of blocking oscillator 40, there will be a space 36.2 microseconds between the stop pulse of one train and the start pulse of the succeeding train, as shown in FIG. 6.

The twenty channel pulses generated in delay line 44 are coupled to the twenty encoding sections of which one encoding section 24 corresponding to channel one is shown. A coincidence circuit or And gate 45 in each encoding section passes a channel pulse if the corresponding gate is also present. That is, if gate generator 35 has generated a pulse which is coupled through cathode follower 37 to the And gate 45 and at the same time the output pulse corresponding to channel one from delay line 44 is also present, coincidence circuit 45 will generate an output pulse which is applied to a blocking oscillator 36. If there is no information on a particular channel, no gate will be generated; hence, even though a channel pulse is present, there will be no output from And circuit 45. This is illustrated in the case of channel R in FIG. 6.

When blocking oscillator 36 has been triggered it generates two 0.5 microsecond output pulses which are coupled to two loads; the encoding gate generator 35 and the gate amplifier 46. The latter pulse which is coupled to gate amplifier 46 is a positive pulse, while the pulse generated by the recovery of the blocking oscillator 36 is a negative pulse and is used to terminate the gate previously started in gate generator 35. By this means the gate generator is now reset, i.e., turned off, enabling it to be started by a later pulse from the audio processor 23. Subsequent channel pulses from the timing unit will not be forwarded to the pulse position modulator section 25 unless a gate has been started by an information pulse from the audio processor section 23. The output and reset pulses from properly gated channels are shown in FIG. 6.

Referring back to timing unit 21, the start and stop pulses which are used for framing are coupled from the delay line 44 through an OR circuit 47 which provides isolation between the taps. The OR output triggers a blocking oscillator 48 whose output is two 0.5 microsecond pulses corresponding to the framing pulses. The framing pulses and the channel pulses from the pulse position modulator sections are all from identically designed blocking oscillators; thus, assuring uniform triggering of the subsequent transmitting unit 22.

The output pulses from the audio processing section 23 are randomly distributed in time with respect to the output of blocking oscillator 40. Since the occurrence of the sampling pulse, i.e., output of blocking oscillator 40, is not related to the input to summing circuit 38, a delay can be experienced between the input to the timing unit 21 and the corresponding output of the timing unit. Consequently, a form of distortion is introduced in which various portions of the speech will be subjected to different amounts of delay not present in the original speech. The maximum delay is determined by the minimum sampling rate of the blocking oscillator 40; 14.4 kilocycles per second, or 69.4 microseconds. The minimum delay is approximately 0.2 microseconds when one channel gates the timing unit for another channel. This is shown in FIG. 6 where processor P make a channel pulse available for encoder section Q. To both of the above maximum and minimum delays must be added the individual inherent delay in the channel coding, the largest of which is 29.5 microseconds for channel 20. The total delay can be appreciable when compared to the period of the highest frequency speech waves, especially the 98.9 microseconds for channel 20, but negligible for the lower frequencies. These delays reduce intelligibility in the clipped speech by about 3 percent below what would be obtained without the delay. As can be seen this figure would increase sharply if the sampling rate of blocking oscillator 40 was reduced.

The purpose of the pulse position modulator section 25 is to time-modulate the channel pulses with respect to the framing pulses with a degree of modulation proportional to the amplitude of the speech envelope at the time of sampling. The amount of allowable pulse displacement, time modulation, is limited by the proximity of adjacent channels. Since the spacing of the channel is 1.45 microseconds and the output pulse width is 0.5 microseconds, the unoccupied time between pulses is 0.95 microseconds. Allowing each pulse to have a maximum modulation region of plus or minus 0.3 microseconds leaves a minimum guard-space of 0.35 microseconds between adjacent channels.

A normal speech envelope covers a wide dynamic amplitude range with the high and low extremes adding little to naturalness. It can be shown that intelligibility also is relatively impervious to moderate peak clippings, therefore, the utilization of moderate peak clipping in an amplifier 49 and clipper 120 makes possible a more efficient use of the modulation region. The output of clipper 120 is coupled to DC amplifier 50. The net gain from the audio processor input of amplifier 49 to the grid of DC amplifier 50 is 4.2 with the gain control of amplifier 49 set at maximum. The audio gain control, not shown, enables adjustment for variations in the average level of audio input signals. The optimum setting of the audio gain control, with a standard military telephone input, is at 0.7 of its maximum which sets the net gain of the circuit at 3. The effect of the peak clipper 120 is to limit the peak speech amplitude at the grid of the DC amplifier 50 to 1.6 volts which corresponds to a microphone-input signal of 0.5 volts.

The DC amplifier output is utilized as one of the control voltages for a voltage comparator 51. Since the time modulation is accomplished through the action of the voltage comparator 51 its static control voltages require a minimum of drift, hence, negative feedback is employed on the DC amplifier 50 to stabilize its quiescent state. Since the gain of this DC amplifier is 10, there is a maximum peak-to-peak variation of 16 volts coupled to the grid of the voltage comparator 51. This peak amplitude was set by the clipper 120 so the voltage comparator remains within its grid base at all times.

Figure 7:
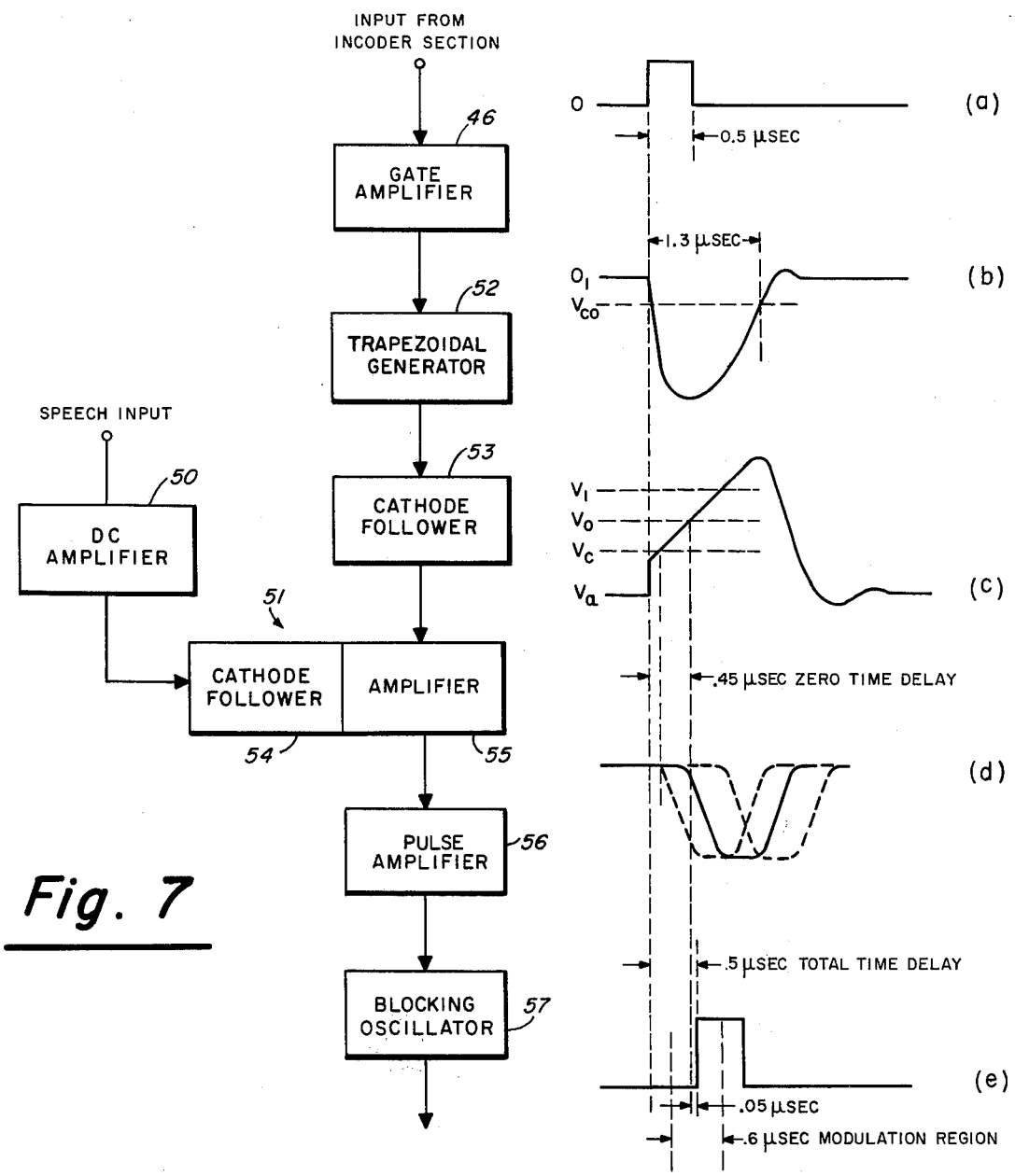
FIG. 7 is a timing diagram for the pulse position modulator section.

The input signal to gate amplifier 46 is a positive channel pulse from the encoding section 24. Reference will now be made to FIG. 7 wherein waveforms at various stages in the pulse position modulator section are illustrated. The 0.5 microsecond input pulse of 7(a) is amplified and stretched to an effective width of 1.3 microseconds as shown in FIG. 7(b). The effective width is determined by the cut off potential $V_{co}$ of the following stage which is the trapozoidal wave generator 52; a 100-ohm variable resistor cathode contained in the trapezoidal wave generator circuit provides a small amount of delay control, as explained later. When the trapezoidal wave generator 52 is triggered from the off condition, its plate potential will experience a step increase followed by an exponential rise towards B+. The initial step increase is caused by a voltage division across circuit elements contained in the trapezoidal wave generator. The rate of rise of this potential is determined by an RC network also contained in trapezoidal wave generator 52. By using only the first few microseconds of the exponential increase of a linear rate of rise is obtained. The output signal of the trapezoidal generator 52 is direct coupled through a cathode follower 53 to the voltage comparator 51. The cathode follower 53 is used to improve the linearity of the trapezoidal wave and maintain a stabilized potential $V_a$ to the voltage comparator.

The voltage comparator is used to mark distinctly the exact time in which the trapezoidal waveform attains a reference level. By causing this reference level to vary in accordance with the speech envelope, a time modulated output is obtained. The voltage comparator 51 consists of a cathode follower 54 is a voltage reference for the amplifier 55 which acts as a switch. The control voltages for the cathode follower 54 are obtained from the DC amplifier 50 while the control voltages for the switching section 55 are obtained from cathode followers 54 and 53 respectively. In the quiescent state, the potentials maintained by cathode followers 53 and 54 combine to bias the switch section well below cutoff. This ensures that variations in the reference level caused by speech signals are insufficient to place the switch section 55 in a conductive state. Referring to FIG. 7(c), the initial stepped increase of the trapezoidal waveform places the switch section 55 in such a condition that the combination of the trapezoidal and speech voltages can cause a switch section to conduct. When the trapezoidal waveform has sufficient amplitude to overcome the bias generator by cathode follower 54, the switch second conducts. This generates an output pulse, as shown in FIG. 7(d). If no speech signal is present, corresponding to zero modulation, the output pulse is generated when the trapezoidal wave reaches $V_o$, FIG. 7(c). Also shown in FIG. 7(c) is the conversion from amplitude to time-modulation where maximum-modulation positive and negative peaks of speech cause an excursion of plus or minus 0.3 microseconds about the zero modulation point. The time delay associated with the zero modulation point is 0.45 microseconds, as shown in FIG. 7(c).

The output pulse from the voltage comparator 51 is an amplified portion of the trapezoidal waveform having a relatively slow rise time. For accurate timing in subsequent trigger circuits, a waveform having a fast rise time is needed. Hence, considerable shaping of this waveform is required prior to triggering a blocking oscillator 57.

Therefore, pulse from the voltage comparator 51 is coupled to a pulse amplifier 56 which is a peaking amplifier and differentiator. The peaking characteristic improves the rise time while the differentiator limits the pulse width of the output pulse. Although the output pulse from pulse amplifier 56 is highly attenuated because of the shaping, pulse amplifier 56 furnishes sufficient amplification to ensure accurate triggering of the blocking oscillator 57.

The blocking oscillator 57 provides output pulses having constant width and amplitude, 0.5 microseconds in width and a peak amplitude of 40 volts positive which are coupled to the transmitter unit 22.

The output pulses from the timing unit 21 are in accurate time sequence. To ensure the same time sequence in the transmitted pulses, an accurate measure and control for all of the channel unit pulses is required. The total time delay of each channel pulse with zero modulation is 0.5 microseconds, as shown in FIG. 7(e) consisting of 0.05 microseconds due to the circuit configuration and 0.45 microseconds necessary due to the modulation requirements. A delay control is incorporated in the pulse position modulator section to ensure that this delay is maintained accurately. The maximum time jitter because of voltage variations, noise, etc., is plus or minus 0.015 microseconds for any one channel pulse.

To determine the effective range of amplitude sampling, the time jitter and clipping effects must be taken into consideration. In the present embodiment the time jitter is 0.015 microseconds, therefore, any input signal that causes less time variation than this will be degraded.

The frequency information content of the amplitude samples is limited by the rate of sampling. For the amplitude samples to give an ideal reproduction of the originating speech it is necessary to sample the speech signals at a rate that is slightly higher than twice the highest significant frequency contained in the speech signals. In the present case, the rate of amplitude sampling is determined directly by the rate of the clipped-speech pulses which are derived from the frequency components contained in the original speech waveform. Therefore, it is obvious that the speech information corresponding to the upper frequencies is not conveyed. However, some indication of the amplitudes of the upper frequency components can be conveyed by sampling the amplitudes of the frequency components at approximately their maximum value which could be attained if a time delay were introduced between the time of sampling and the pulses corresponding to the zero crossover points. This time delay or phase lag is determined by the pre-emphasis network and regenerative amplifier in the audio processor section. The time delay is common to all the speech signals and is proportional to frequency and inversely proportional to their amplitude. This enables all the frequency components to be sampled at approximately their peak value rather than at the original crossover point. The above technique improves the time modulation information, but not to the point necessary for complete speech information transfer. This results in amplitude sampled speech having very good quality and all of the speakers' natural characteristics, but having a very low intelligence content.

Hence, the upper frequency limit of the amplitude sampled information is determined by the number of occurrence of clipped speech pulses generated per speech signal. Since it is difficult to ascertain the number of pulses generated per speech signal, it is rather difficult to specify a fixed upper frequency limit for the amplitude sampling. However, by using intelligibility testing techniques, it was determined that the reproduced amplitude information has a very good low frequency response but a poor high frequency response. Therefore, because of the sampling technique employed, it was determined that the information contained in just the amplitude sample is not adequate by itself for complete information transfer.

In view of the fact that the clipped-speech sampling pulses directly represent the frequencies contained in the speech signals and the modulation of the pulses represents the instantaneous amplitudes of the speech signals, the two significant portions of speech information are transmitted. Therefore, it is possible to regenerate a speech signal that is adequate for communications by combining, in the audio reprocessing unit of the receiver terminal the desirable characteristics of the frequency and amplitude information.

The trains of pulses are propagated from transmitter unit 22 which is an existing AN/APX—6 transmitter. The purpose of the transmitter unit 22 is to sum the inputs from the individual channel units and to form suitable rf pulses for propagation.

The 0.5 microsecond output pulses from the 20 channel units corresponding to unit 20, and the start and stop pulses from the single timing unit 21 comprise the input to the transmitter unit 22. The input OR circuit contained in 58 provides isolation between the individual inputs. The output from OR circuit 58 drives a modulator driver 59. Any slight fluctuation in the base line generated by the OR circuit 58 is based-clipped at the input to the modulator driver 59 as controlled by a drive adjust potentiometer contained therein. The modulator driver 59 generates a positive low impedance pluse which is adequate for driving the AN/APX-6 and presumably many other modulator units.

The output of the modulator driver 59 is coupled to modulator 60 which consists of a dual tetrode parallel-connected unit, the output of which is stepped up by a modulation transformer and delivered to a transmitter oscillator contained in RF unit 61. The transmitter oscillator contained in unit 61 uses a pulse grounded-grid circuit and coaxial double re-entrant line. The transmitter frequency was set at 1110 megacycles per second during all tests that were conducted. The peak radiated power from unit 61 is 175 watts for the 0.5 microsecond pulses. The output pulses from RF unit 61 are then coupled to antenna 62 for propagation into space.

For each start-stop pulse input from the timing unit there is at least one channel output and at most 20 channel outputs. Since the channel outputs are determined by their speech inputs, which are random in nature, it is difficult to specify a given number of channel pulses per framing group. However, by using the average rate of 2050 pulses per second per channel in the binomial distribution formula, it was determined and confirmed by repeated experiments, that the most probable occurrence of channel pulses per framing group lies between 2 and 4. The average figure of three channel pulses per framing group and the nominal blocking oscillator rate of 15,000 samples per second was used in determining the average duty cycle for full 20-channel operation. In that the three channel pulses are always accompanied by two framing pulses and all five pulses are 0.5 microseconds in width, the average duty cycle is therefore 3.75 percent. Note that there has been no mention as to which channels are present, but only that on the average there are three channels per framing group, i.e., three channels per start and stop pulse. This point has significance in relation to jamming interference, in that the three channels may be located at any position corresponding to the 20 channels available which lie between each of the start and stop pulses.

A typical transmitted train configuration is shown in FIG. 1. The first pulse transmitted corresponds to the start pulse, followed by equal intervals of 1.45 microseconds which represent the channel slots. The last pulse in the train configuration represents the stop pulse.

Figure 3:
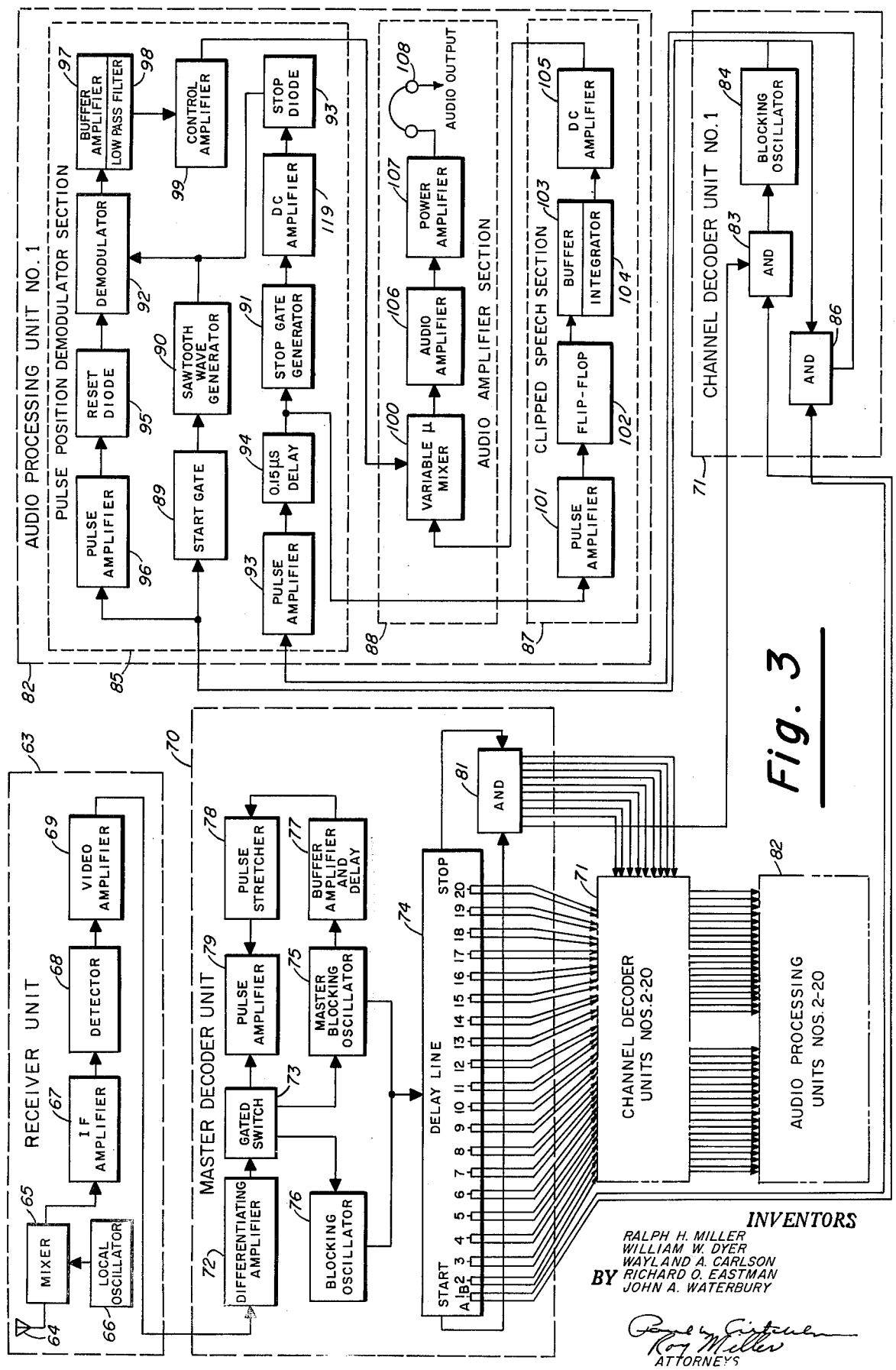
FIG. 3 is a simplified receiver assembly block diagram.

The receiver assembly shown in FIG. 3 contains a receiver unit 63 which is modified AN/APX-6 receiver of the superheterodyne type operating in the L-band of frequencies and having a sensitivity of 70 dbm and a bandwidth of 10 megacycles at 60 db down from maximum.

Signals are received on antenna 64 and coupled to a mixer 65 wherein the input signals are mixed with the output of a local oscillator 66 resulting in an intermediate frequency signal of 59.5 megacycles per second. The intermediate signal is then coupled to a IF amplifier 67 for amplification, then to a detector 68 which produces the original transmitted pulse train configuration. These pulses are then amplified in video amplifiers 69 which feed a four volt peak signal to a master decoder unit 70.

The master decoder unit 70 separates the incoming signal into channels, each of which is then further processed in an individual channel decoder unit 71. A secondary purpose of the master decoder unit is to generate a time reference pulse which activates each of the channel decoder units.

The output pulses from video amplifier 69 are coupled to a differentiating amplifier 72 which provides output pulses limited to a maximum width of 0.2 microseconds and of a signal amplitude adequate to operate a subsequent gated switch 73. The output pulses from the differentiating amplifier 72 are limited in width in order to decrease the possibility that wide input pulses may cause multiple outputs from subsequent circuitry, thus, minimizing the effect of wide pulse jamming.

Figure 8:
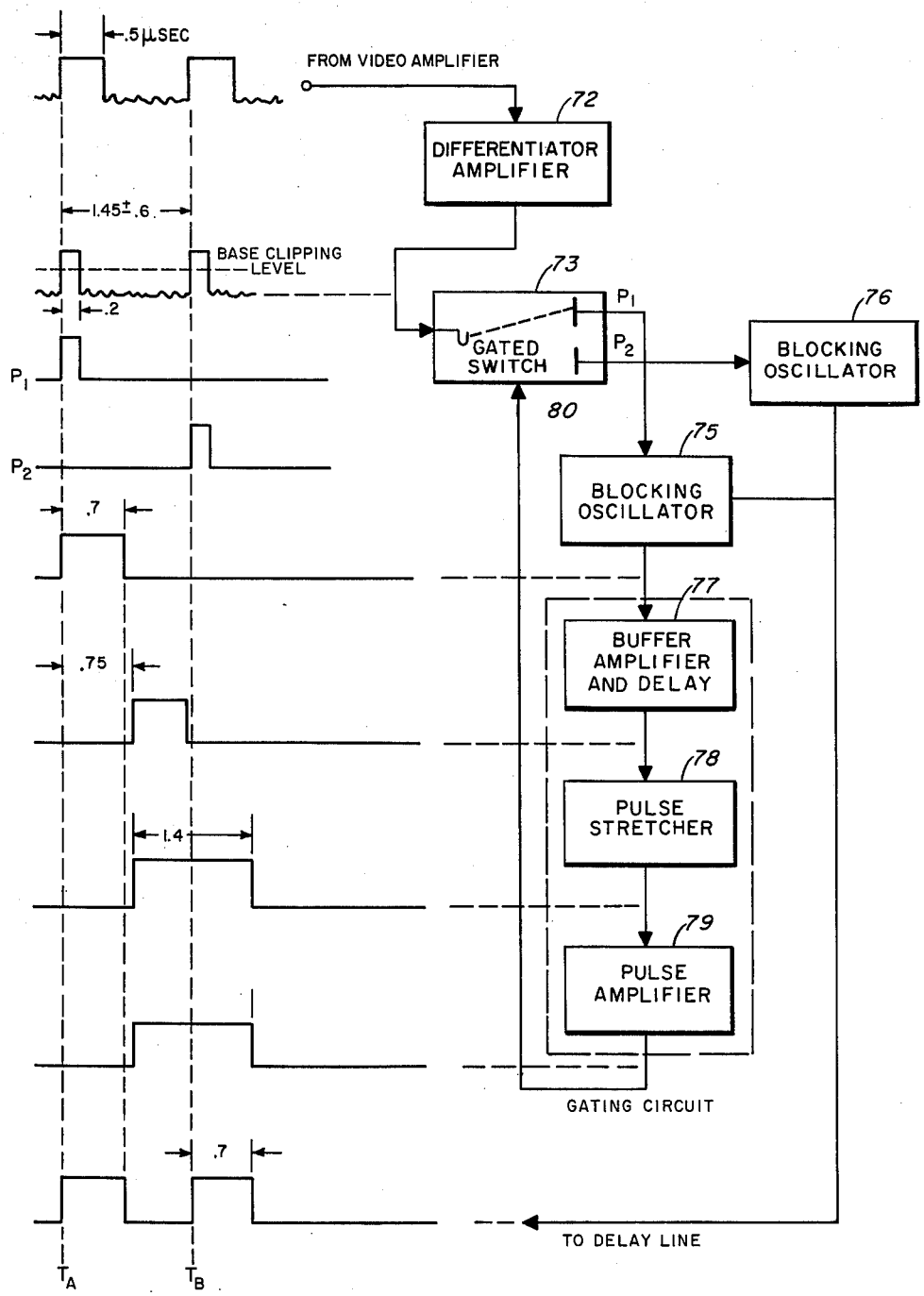
FIG. 8 is a timing diagram for the master decoder unit.

When the receiver unit is set for maximum sensitivity, the video output is composed of four volt signals and noise spikes of 0.5 volts. Since the remaining circuitry of the master decoder unit generates pulses upon the reception of any trigger, noise effects must be minimized. This is accomplished by base clipping the noise spikes, as shown in FIG. 8. The gated switch 73 is biased below cut-off by the setting of a trigger level control not shown. The amount of clipping is then determined by how far below cut-off the gated switch 73 is biased and by the magnitude of the signal presented to its grid. By adjusting various controls, an optimum condition can be established between desired signals and noise spikes and by adjusting the aforesaid controls during jamming tests, it was possible to maintain adequate operation of the system when the desired signals exceeded noise or pulse peak jamming signals by only 25 percent.

A delay line 74 is the major component of the master decoder unit 70 and the preceding circuitry of the master decoder unit serves primarily to provide a high-amplitude low-impedance drive for this delay line. In ordinary operation a single blocking oscillator could provide this function, however, due to the decoding of the plus or minus 0.3 microseconds modulation from the input pulse trains, it is necessary to generate pulses 0.7 microseconds wide and as close together as 0.85 microseconds. The recovery characteristics of blocking oscillators preclude the use of a single unit for such rapid operation. Hence, it is necessary to provide two blocking oscillators which operate alternately when the fastest triggering becomes necessary. Therefore, a master oscillator 75 is provided and a second blocking oscillator 76 is switched in only as needed. The operation of this circuitry is shown diagrammatically in FIG. 8.

Figure 9:
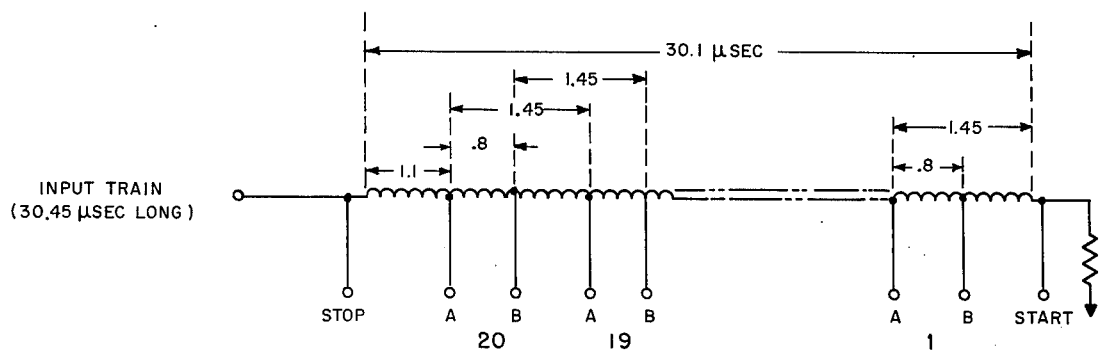
FIG. 9 is a timing diagram of the decoder delay line configuration.

In the operation of the master decoder unit, a pulse from the receiver unit 63 at time (T) is differentiated and based clipped. This pulse is then coupled through the gated switch 73 to $P_1$ which triggers blocking oscillator 75 thereby generating a 0.7 microsecond pulse. One output of blocking oscillator 75 is coupled to the delay line and the other is applied to "ring-around" gating circuits. The "ring-around" gating circuit comprises a buffer amplifier and delay unit 77, pulse stretcher 78, and pulse amplifier 79. The gating circuits delay the pulse by 0.75 microseconds and then stretch the pulse to an effective width of 1.4 microseconds. The stretched pulse is then amplified in pulse amplifier 79 and returned to the foxusing electrode as at 80, of the gated switch 73, causing the beam to switch to $P_2$ during the gate intervals of 1.4 microseconds. This gate interval covers the modulation region of the succeeding adjacent channel, yet is narrow enough to ensure recovery between alternate regions. If an input pulse occurs during this gating interval, it triggers blocking oscillator 76 which also generates a 0.7 microsecond pulse. The output of either blocking oscillator can drive the delay line 74 as shown in FIG. 8. The delay line 74 shown in detail in FIG. 9 converts a single input pulse train to simultaneous time-modulated outputs to multiple channels. The delay line configuration of FIG. 9 includes 20 channel taps; two taps per channel and one tap each for the start and stop pulses, i.e., 42 taps in all. The dual taps, that is, the A and B taps, per channel are necessary for recovery of modulation information and will be discussed in detail below.

Since delay lines are low-pass filters, the rise-times of pulses propagated down the delay line are deteriorated, causing some ambiguity in an accurate timing of subsequent circuits. The odd spacing between the input and tap A of channel 20 helps to compensate for this effect. The fact that the line is 30.1 microseconds long, whereas the input train is 30.45 microseconds long, also is used for compensation. Since the train is 0.35 microseconds longer than the delay line, the coincidences of the start-stop pulses established in And circuit 81 result in an output reference pulse only 0.35 microsecond long whose rise-time is the same as that of undeteriorated stop-pulse. The rejection ratio for the circuit is 12 to 1 between coincidence and noncoincidence.

The output of the single master decoder unit is coupled to an appropriate channel decoder unit 71. The purpose of the channel decoder units 71 is to determine the presence of information on a particular channel and to convey this information to an appropriate audio processing unit 82. This is accomplished by comparing the output reference pulse from And gate 81 to the individual channel pulses from delay line 74 in And circuit 83.

There is one channel decoder unit 71 and one audio processing unit 82 for each channel. For multiplexed operation as disclosed in the present invention there are 20 of these units, however, to simplify the remaining discussion only a single channel will be discussed.

Figure 10:
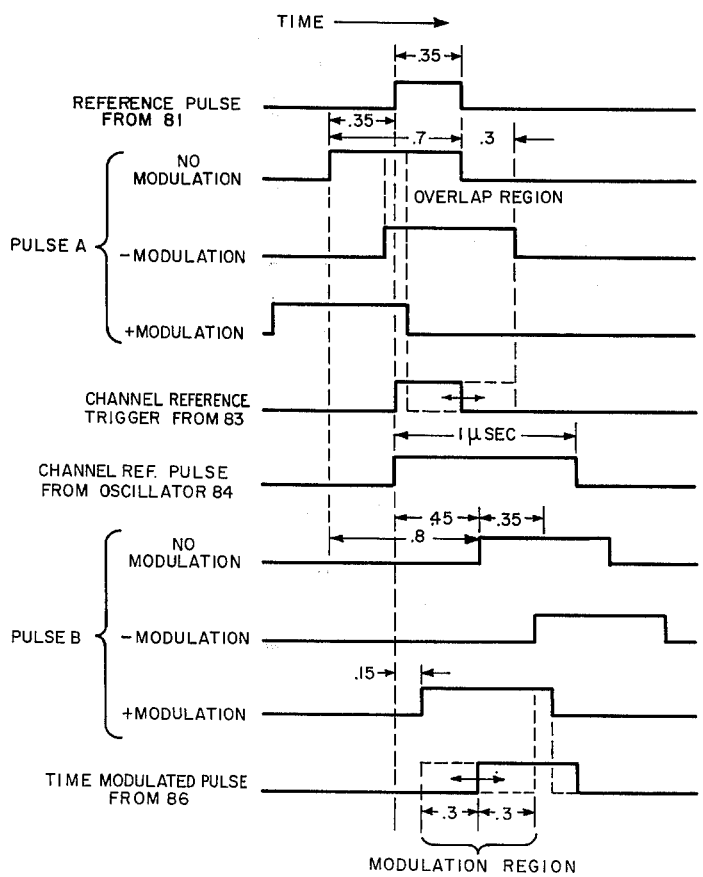
FIG. 10 is a timing diagram for a channel decoder unit.

The output reference pulse from And gate 81 and the pulse from tap A are coupled from the master decoder unit 70 to the And gate 83, as shown in FIG. 3. The A pulse is used to activate And gate 83 slightly prior to the reception of the reference pulse from And gate 81. The presence of pulse A indicates the presence of information on its corresponding channel. FIG. 10 is a complete timing diagram of the channel decoder unit 71 of channel 1 and is applicable to all channel decoder units. The time interval of 0.35 microseconds between the reference pulse and the zero-modulated pulse A was explained previously by the fact that the pulse train is 0.35 microseconds longer than the delay line 74. This time delay allows the leading edge of the reference pulse to occur at the center of the zero modulated pulse A. Since pulse A is time-modulated with respect to the reference pulse, it is necessary that the pulse A be at least as wide as the maximum modulation excursions in order to activate And gate 83 prior to and during the occurrence of the reference pulse. This is accomplished by making pulse A 0.7 microseconds wide, thereby allowing the maximum modulation of plus or minus 0.3 microseconds to always encompass, including an over-lapped region, the sharp leading edge of the reference pulse. This ensures that a time reference pulse will be preserved in the output of And gate 83. Maximum modulation of pulse A and a minimum over-lapped region are shown in FIG. 10.

The output of And gate 83 is referred to as the channel reference trigger and is used to trigger a one-microsecond blocking oscillator. The output of blocking oscillator 84 which maintains the accurate reference pulse timing, is used to trigger a pulse position demodulator section 85 contained in audio reprocessing unit 82, and to activate And gate 86 in the channel decoder unit 71.

The purpose of the And gate 86 is to act as a gate between the delay line 74 and pulse position demodulator section 85. When And gate 83 determines that information is present on a particular channel, And gate 86 is activated by the action of And gate 83. This allows the time-modulated pulse B to be fed to the pulse position demodulator section 85 only when time-synchronized information is present.

The And circuit 86 is a two-point coincidence circuit and the inputs to the circuit are the channel reference pulse from blocking oscillator 84 and the time modulated pulse B from the delay line as shown in FIG. 3. The one-microsecond channel reference pulse activates the circuit 0.45 microseconds prior to the arrival of the zero modulated pulse B as shown in FIG. 10. Since pulse A occurs 0.35 microseconds ahead of the reference pulse and taps A and B are separated by 0.8 microseconds on the delay line, an output from B occurs 0.45 microseconds after the reference pulse. By having the channel reference pulse overlap the leading edge of pulse B, the leading edge or modulation of pulse B is retained. The output of And circuit 86 is a pulse varying in width from 0.25 to 0.7 microsecond. Maximum positive or negative modulation causes its leading edge to shift minus or plus 0.3 microseconds from the zero modulation position.

The output of channel decoder unit 71 is coupled to the corresponding audio processing unit 82 comprising a pulse position demodulator section 85, clipped speech section 87, and audio amplifier section 88. The overall purpose of the audio processing unit is to convert the information applying to a particular channel pulse to a reproduction of the originating signals. The pulse position demodulator section 85 recovers the audio amplitude information, while the clipped speech section 87 recovers the audio frequency information. The audio amplifier section 88 then combines the two types of information and reconstructs the originating signal.

The pulse position modulation information is converted to a DC voltage, which is proportional to the time-shift, in the pulse position demodulator section 85. This is accomplished by charging a capacitor in a demodulator 92 to a potential which is proportional to the time difference between the channel reference pulse and the time-modulated pulse. The small amount of integration of the peak potentials acquired by this capacitor eliminates the highest frequency components and produces a DC voltage whose average value is proportional to the frequencies desired to be retained for reproduction. This signal is then used as a control voltage for the audio amplifier section 88, somewhat in the manner of AVC.

The time difference between the channel reference pulse and the time-modulated pulse is converted to a DC voltage, proportional to this time difference. The output pulse from blocking oscillator 84 corresponding to the channel reference pulse triggers a start gate 89 which, in turn, triggers the start of a sawtooth wave generator 90. The sawtooth wave is terminated by the action of the stop gate generator 91 which is triggered by the time modulated pulse. The finite rise in amplitude of the sawtooth wave is determined by the time interval between the channel reference pulse and time modulated pulse which is proportional to the instantaneous amplitude of the originating signal. The peak voltage variation is then used to drive the demodulator 92.

The start gate 89 and sawtooth wave generator 90 functions are accomplished by a cathode-coupled one-shot multi-vibrator which produces a fixed-time varying voltage. The positive channel reference pulse triggers one section of the multivibrator corresponding to start gate 89 from the biased-off condition to "on" for a period of 1.5 microseconds. Once triggered, the "on" period is determined by the grid circuit time constant of the second section of the multivibrator corresponding to 90. When the second section of the multi-vibrator, corresponding to sawtooth wave generator, which is normally on, is turned off by the action of the first section, its plate voltage rises exponentially toward B−. This rise is determined by various circuit elements contained in the sawtooth wave generator circuit 90. By using only the initial rise of the exponential increase, at a 60 volt/microsecond rate, a near-linear waveform is generated for 1.5 microseconds. The termination of the start gate terminates the sawtooth wave when not previously terminated by the action of the stop gate generator 91 as shown by the dashed curve in the timing diagram for the pulse position demodulator section, FIG. 11.

The output of And circuit 86 is coupled to pulse amplifier 93 wherein the time modulated pulse is amplified and then coupled to a delay circuit 94 and delayed 0.15 microsecond prior to triggering the stop gate generator 91 and the clipped speech section 87. The purpose of this delay will be explained subsequently in the section covering the reset diode 95. The stop-gate generator 91 is a cathode coupled one-shot multivibrator which generates a positive 1.5 microsecond gate. This gate is used to drive a DC amplifier 119 into a highly conductive state.

The DC amplifier 119 and stop diode 93 terminate the generation of the sawtooth wave previously initiated by the start gate 89. By terminating the sawtooth wave by the action of the time-modulated pulse, a peak voltage proportional to the time modulation is obtained.

The stop diode 93 is back-biased by the quiescent conditions of the DC amplifier 119 and sawtooth wave generator 90.

Figure 11:
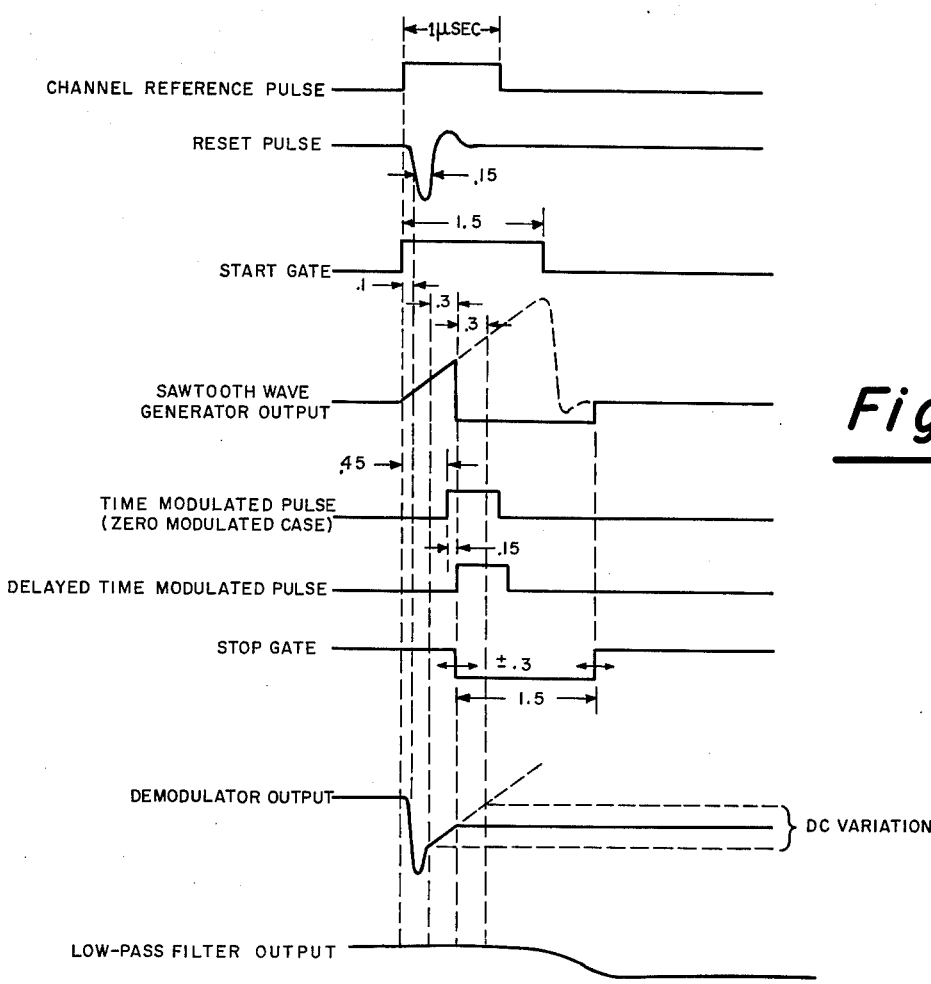
FIG. 11 is a timing diagram for a pulse position demodulator section.

The output of the stop gate generator 91 drives the DC amplifier 119 into a highly conductive state causing the plate voltage to drop at a rate of approximately 200 volts per microsecond. When the plate voltage of the DC amplifier falls slightly below the instantaneous voltage of the sawtooth wave the stop diode 93 conducts. This causes the output of the sawtooth wave generator to be clamped to the plate potential of the DC amplifier 119. This action terminates the positive rate of rise of the sawtooth wave after 0.6 microseconds for the zero modulation case. This is shown in FIG. 11 for the solid portion of the curve labeled Sawtooth Wave Generator Output. The peak voltage output to the demodulator circuit 92 is 36 volts for zero modulation, plus or minus 18 volts respectively for minus or plus 0.3 microseconds modulation.

The stop gate overlaps the start gate by 0.6 microseconds, ensuring that during a maximum modulation period of −0.3 microseconds the start gate will terminate prior to the stop gate. This removes the possibility of multiple sawtooth waves being generated during a single gate interval.

The demodulator circuit 92 converts the applied peak voltage variations from the sawtooth generator to a DC variation through the use of appropriate circuitry consisting of a cathode follower, set diode and capacitor not shown.

The cathode follower portion of the demodulator 92 provides a high impedance load to the sawtooth generator 90 and a low source impedance to the charging capacitor contained therein to demodulator circuit 92. The gain of the cathode follower portion is nonlinear, in that it increases with increasing input. This helps to improve the over-all linearity of the output sawtooth wave. The output sawtooth of the cathode follower has a rising slope of 48 volts per microsecond and a terminating slope of 170 volts per microsecond. The peak voltage variations applied to the set diode are 28.8 volts plus or minus 14.4 volts.

Normally the set diode portion is back-biased by the presence of a residual potential on the demodulator capacitor in demodulator circuit 92. When the applied signal to the set diode exceeds the potential of the demodulator capacitor, the set diode conducts. This provides a low impedance charging path for the demodulator capacitor. The low impedance charging path allows the capacitor to change to 0.9 of the peak voltage applied. When the sawtooth wave reverses its slope, i.e., terminates, the demodulator capacitor will lose approximately 2% of its attained peak potential before the set diode is biased off. When the set diode is again back-biased, a ten-millisecond time constant prevents rapid discharge of the demodulator capacitor. If the rate of amplitude sampled information is less than 400 pulses per second the finite timeconstant causes distortion in the DC output levels of the demodulator circuit 92. A typical demodulator output is shown in FIG. 11.

In order to permit the demodulator capacitor to vary its potential in accordance with the modulation, it is necessary to reduce its residual potential below the minimum modulation potential prior to setting it at a new level. This is accomplished by discharging the capacitor through the reset diode 95. The output of blocking oscillator 84 corresponding to the channel reference pulse, shown in FIG. 11, is amplified and differentiated in pulse amplifier 96. The resulting negative pulse is labeled the reset pulse and is coupled to the reset diode 95. It has 130 volts amplitude and a width of 0.15 microsecond.

The plate of the reset diode portion is connected to the demodulator capacitor. The circuit comprising the reset diode and demodulator capacitor is designed to insure that the reset diode is back-biased for any potential to be applied to the demodulator capacitor. Upon receiving the negative reset pulse, the reset diode conducts in the forward direction, discharging the demodulator capacitor below the minimum modulation level. Due to its finite discharge time, it is necessary to have the reset pulse very large in amplitude in order to vocer the modulation range pulse or minus 13 volts.

Referring to the demodulator output, FIG. 11, it is shown that a reset pulse requires 0.2 microseconds to reset the demodulator capacitor. To insure that the reset pulse does not interfere with the action of the sawtooth wave requires the delaying of the time modulated pulse by 0.15 seconds. This allows 0.1 microseconds between the termination of the reset pulse and the occurrence of the minimum peak voltage variation of the sawtooth wave.

The demodulator capacitor contained in demodulator circuit 92 is direct-coupled to a buffer amplifier 97. This amplifier has a very high input impedance which provides minimum loading to the demodulator capacitor and a low impedance output to drive a low-pass filter 98.

The purpose of the low-pass filter is to attenuate highly the sudden transitions experienced in the demodulation process, that is, to convert the step changes to gradual changes which more naturally follow the input speech characteristics. The filter 98 is a conventional RC circuit having a step-roll characteristic of 6 db per octave with an attenuation of 3 db at 1500 cycles per second.

The output of the low-pass filter for a single speech transition is shown in FIG. 11 as a DC variation. The output from the filter in the quiescent condition is 24 volts and having a change of plus or minus 5 volts which correspond to a modulation of minus or plus 0.3 microseconds.

The output from filter 98 is connected directly to a control amplifier 99 which has a gain of 1.8, resulting in an output of plus or minus 9 volts for maximum modulation excursions. This output from control amplifier 99 controls the gain of a variable Mu mixer 100, subsequently described.

A second output of the 0.15 microsecond delay circuit 94 is introduced into the clipped speech section 87, the purpose of which is to recover the infinitely clipped speech information from the time-modulated pulses. This is accomplished by having the time-modulated pulses generate rectangular waveforms which are similar to the original clipped speech. The restored clipped speech is then integrated to improve its speech quality, prior to mixing with the separate amplitude information in the audio amplifier section 88.

The positive time-modulated pulses from the output of the delay circuit 94 are based clipped prior to being amplified, inverted and stretched in pulse amplifier 101. The base clipping removes the possibility of the clipped speech section 87 being triggered by extraneous pulses. The output of pulse amplifier 101 is then introduced into a fip-flop 102. For stable operation, the flip-flop 102 requires a very large negative trigger pulse with a width greater than 0.5 microsecond. Since the width of the time-modulated pulse varies from 0.25 to 0.7 microsecond with modulation, FIG. 10, a one-microsecond pulse transformer is incorporated in the output of the pulse amplifier 101 to stretch the width of the trigger signal to the succeeding flip-flop circuit 102.

Each time-modulated pulse represents a cross-over of the infinitely clipped speech waveform as its changes states in the audio processor section. These pulses trigger the flip-flop 102, a bistable multivibrator, whose plate voltages alternate between two fixed levels to form rectangular waveforms constant in amplitude but varying in time base. The variation in time base is equal to the period between the time-modulated pulses. The output signal from either of the two plates of the flip-flop 102 is the reconstructed clipped speech which is capacitively coupled to a high impedance netwrok at the grid of a buffer amplifier 103.

The operation of the flip-flop circuit 102 is sensitive to loading effects; consequently the RC coupling to the buffer amplifier is designed to have a very large impedance and timeconstant. The latter preserves the low frequency response of the regenerated speech.

It is desirable to filter the clipped speech before acoustical reproduction to improve naturalness and to reduce the harshness of the speech signals caused by the rapid transitions of the rectangular waves which generate high frequency modulation products. This filtering is accomplished in an integrating network 104 between buffer 103 and the grid of a DC amplifier 105. The integrating network 104 acts as a low-pass filter and averaging device. It has a step-roll characteristic of 6 db per octave with an attenuation of 3 db at 5 kc per second. The peak-to-peak output of the network 104 is set at two volts by an appropriate amplitude control at the input of the buffer 103. These particular values were established by intelligibility testing and listening judgment.

The DC amplifier 105 provides a variable Mu circuit 100 of the audio amplifier section 88 with a low impedance variable bias. This bias is determined by the two potentials connected to the grid circuit of the DC amplifier. One potential is developed by a positive voltage network, not shown, which places the amplifier in a high transconductance region to produce a low output impedance. The other is a variable potential determined by the peak-to-peak output of the integrating network 104. The gain of the DC amplifier is 0.9; consequently, the direct-coupled output bias to the cathode of the variable Mu tube 100 is 56 plus or minus 0.9 volts.

In the audio amplifier section 88, the clipped speech information and the audio amplitude information are combined in a form that is suitable for acoustical reproduction. This is accomplished by combining the two signals in a nonlinear mixer prior to driving an output device. The mixing operation is so adjusted as to enable the audio amplitude information to control the gain of the integrated clipped speech. By this means, many of the undesirable effects of clipped speech are minimized while still maintaining a high degree of intelligence.

The output of the DC amplifier which contains the audio frequency information is coupled to the variable Mu mixer 100 which performs two functions. It acts as a fairly linear amplifier for the amplitude information signals and, at the same time, as a variable amplifier for the frequency information signals. The clipped speech is made to vary in amplitude, as did the unprocessed input speech, by combining amplitude signal information with the frequency information, thus improving the naturalness of the output speech.

The linear amplifier function of the variable Mu mixer 100 is as follows. The static conditions are determined by the fixed potentials to the control grid, screen grid and cathode of the variable Mu tube. Since the cathode is maintained at a fixed positive potential by the low impedance DC amplifier 105, the gain of the stage is proportional to the instantaneous grid circuit variations, i.e., amplitude information. In order to improve the overall linearity of the circuit, the screen grid potential is not completely filtered. By allowing the screen grid circuit to act as a degenerative element the normally nonlinear operation of the variable Mu tube is minimized. For maximum amplitude signals of plus or minus 9 volts applied to the control grid, the instantaneous gains are 2.8 and 1.6, respectively, and the gain is 2 for small input signals. These maximum variations in the gain indicate a relatively small departure from a linear amplifier.

The variable-gain amplifier function of the variable Mu mixer 100 is as follows. The clipped speech signals are directly connected to the cathode of the variable Mu amplifier from the DC amplifier 105. Their puls or minus 0.9 volt amplitude is insufficient to cause appreciable change in gain, however, the instantaneous gain is proportional to the potentials applied to the control grid. This enables the amplitude information signals to control the gain of the clipped speech. The clipped speech signals have a gain of 12 db when the amplitude information has zero amplitude, 20.5 and 3 db respectively for maximum amplitude excursions and plus or minus 9 volts.

The ratio of clipped speech to amplitude signals and the exact static settings of the variable Mu amplifier are adjusted to produce maximum intelligibility by means of appropriate testing. The reconstructed speech output from the variable Mu mixer 100 is coupled to audio amplifier 106 and then to a power amplifier 107 for further amplification. The power amplifier 107 is single-ended class A with an output impedance of 600 ohms. The output of the power amplifier is then used to drive an appropriate 600-ohm listening device 108 or other apparatus.

Reconstructed clipped speech contains a high degree of intelligence but is unnatural and annoying to listen to. Amplitude information signals by themselves are low in intelligence content but are not fatiguing to listen to and do retain many of the natural characteristics of speech as heretofore pointed out. Comparing the two signals on an intelligibility basis, The integrated clipped speech signals score 17 percent higher than the amplitude information signals, from average input speech with a good signal-to-noise ratio. Therefore, by combining the two types of information, i.e., frequency and amplitude, it is possible to minimize the undesirable characteristics of the clipped speech while still maintaining a high degree of intelligibility.

By utilizing the mixing technique as described in conjunction with the variable Mu mixer 100, the burst effect of the clipped speech signals is minimized by having the amplitudes of the clipped speech signals built up gradually in accordance with the amplitude information derived from the pulse position demodulator section 85. The sharpness and crispness of the clipped speech signals also are reduced although not eliminated by the low-pass filter incorporated in the integrator 104 in the clipped speech section 87.

In determining intelligibility under various conditions it is noted that the average measured intelligibility level attained by the present system is 84% using phonetically balanced word lists with trained listeners when the input signal is relatively noise-free, 27 db signal-to-noise ratio. Although the integrated clipped speech alone scores 4% higher under the same conditions, this difference may be within the margin of error; however, the naturalness and ease of listening of the mixed signal output overcome this slight difference. It is also noted that as the input speech gets noisier, for instance, under battle conditions where high noise conditions previal, the intelligibility of the clipped speech falls much more rapidly than the intelligibility of the mixed signals. Although a good input-signal-to-noise ratio is desirable in the present system, it is not as mandatory as it was in copending applications Random Transmission Clipped Speech Coded Communications System, Ser. No. 106,413, filed 27 Apr. 1961 and Quantized Nonsynchronous Clipped Speech Multi-Channel Coded Communications System, Ser. No. 107,591, filed 3 May 1961. The reason for improved intelligibility for a decreasing signal-to-noise ratio is that there are more effective crossovers in the amplitude channel, thereby increasing the sampling rate of the input signals and the consequent information rate. The noise-crossovers are also present in the clipped speech channel and, when mixed, tend to reduce the resultant over-all intelligibility. By initially establishing the proper ratio of amplitude to clipped speech signals, the above situation is optimized.

In the present case the output speech from the audio reprocessing unit 82 is highly intelligible and retains many of the natural characteristics exhibited by the input speech to the transmitter unit. It has been determined that, after only a few minutes of listening time, untrained listeners recorded phonetically balanced words with 75 per cent accuracy, this compares to 95 per cent accuracy with conventional speech messages. With the present system, word intelligibility scores of 70 percent or higher are attained with trained listeners for input-signal-to-noise ratios as low as 5 db.

Other tests were conducted to determine the capability of the present system to intentional interference or jamming. The actual test used are not included in the present application, however, it was determined that the system is relatively jam resistant, i.e., word intelligibility per channel remains in the operative range. It is well to note that under the influence of heavy jamming, the effects of the jammer can be greatly reduced by restricting the operation of the system to just a few selected channels.

In addition to systems may be utilized in a communication network wherein messages may be addressed to particular stations in the net.

Figure 12:
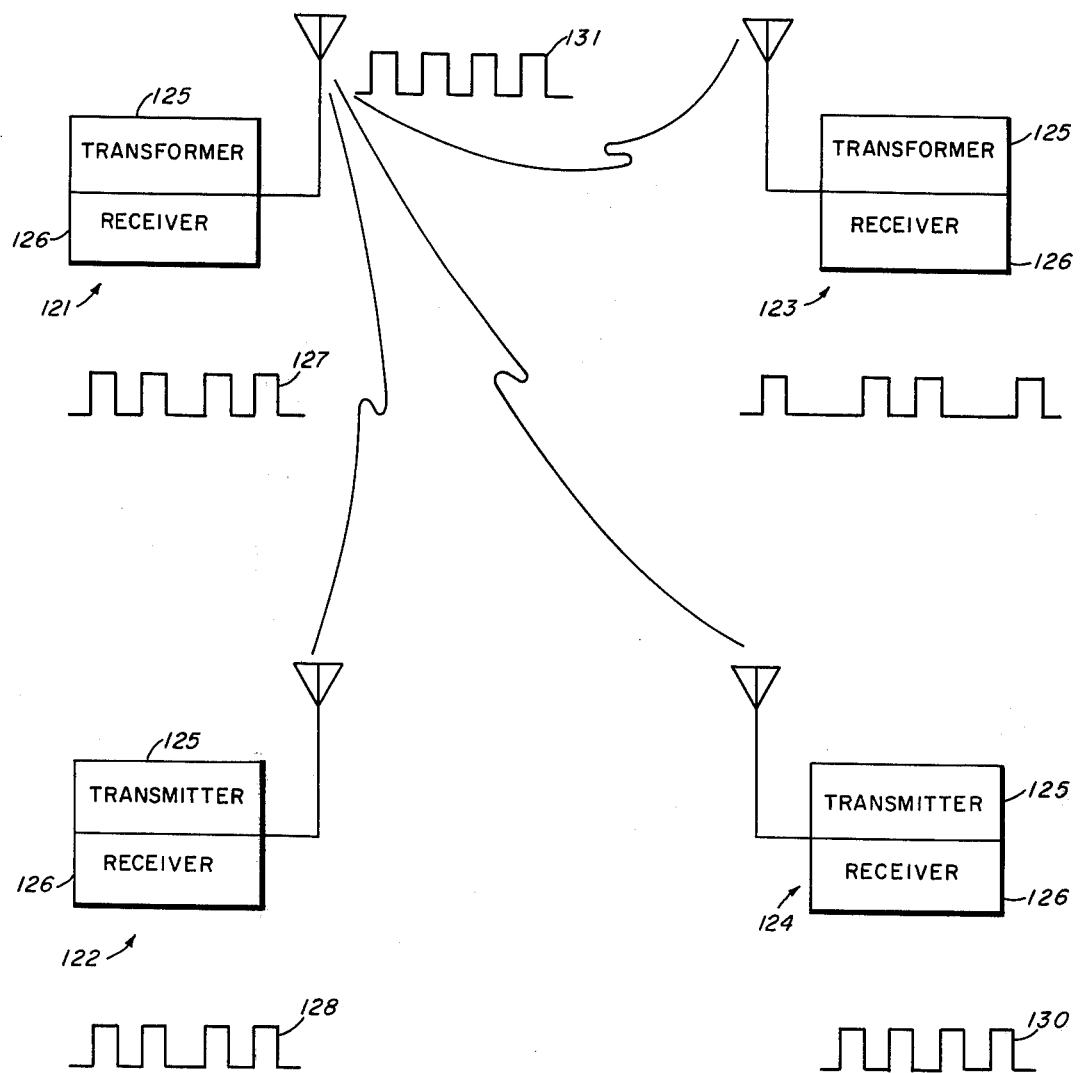
FIG. 12 is a simplified block diagram of a communications network for addressing communications to desired stations.

FIG. 12 is a simplified block diagram of the proposed system whereby a communication is addressed to a particular receiver system. Individual communications units are indicated at 121, 122, 123, and 124 each unit consisting of a transmitter terminal 125 and receiver terminal 126. The transmitters are of the type disclosed in FIG. 2 of the present invention. However, receivers 126 of the communications units will consist of only one channel of the receiver system as set forth in FIG. 3. This would be exactly the same as the receiver terminal of FIG. 3 except that only one channel decoder and one audio processing unit would be used. Each of the receivers has a particular train or group of pulses which it will respond to as shown at 127, 128, 129 and 130.

In the operation of the complete net, any one of the units 121, 122, 123 and 124 may communicate with any other of the units. For example, if unit 121 desires to communicate with unit 124, a particular code is transmitted by transmitter 125 of unit 121, as at 131 which is the address of unit 124 and will be received and converted into audio, in the present example, in receiver 126.

The same would hold for any other of the units, i.e., unit 122 could communicate with unit 123 by transmitting the group of pulses corresponding to the address of the receiver 126 of unit 123 and vice versa.

In the present example, by using a transmitter capable of multiplexing twenty channels, twenty-one different units such as 121, 122, 123 and 124 may be provided.

Therefore, it is seen that the present system provides a system capable of multi-channel communications and allows the transmission of a multiplicity of channels of pulsetype multiplexed speech without the necessity for synchronizing transmission, i.e., no signal is transmitted between intervals of information. Therefore, the present system has a very low-duty cycle compared to other communications systems. In addition, the system can be operated into existing telephone terminal equipment and performs adequately under conditions of large ambient noise near the microphone, interference, and jamming. Additionally, with converters, the system is very well adapted to teletype transmission and reception.

As with the copending applications Random Transmission Clipped Speech Coded Communications System, Ser. No. 106,413, filed 27 Apr. 1961 and Quantized Nonsynchronous Clipped Speech Multi-Channel Coded Communications System, Ser. No. 107,591 filed 3 May 1961, the system is secured against casual eavesdropping when more than one channel is in operation. Determined eavesdropping would require duplication of receiving equipment. The system further provides a degree of intelligibility entirely adequate for communications through the addition of amplitude-information to the frequency information contained in clipped speech. This is accomplished through the nearly optimum amplitude sampling of the input wave at a rate and time determined by the pulse generated at the zero crossover points of the input composite wave. This provides a quality of output which, although not extremely high fidelity, is superior to that of any other known clipped speech developments.

Although the present system was not designed for speech privacy, the binary type of operation lends itself well to the use of digital type cryptographic equipment which would make the speech secure. If, instead of using single-frequency pulses, the energy were spread over a large portion of the spectrum, the intelligence could be masked by ambient noise, making monitoring by the enemy less likely and, hence, probably reducing the permutations required of the cryptographer.

Obviously many modifications and variations of the present invention are possible in the light of the above teachings. It is therefore to be understood, that within the scope of the appended claims the invention may be practiced otherwise than as specifically described.

What is claimed is:

1. A quantized pulse-modulated nonsynchronous clipped speech multi-channel coded communication system comprising transmitter terminals and receiver terminals; said transmitter terminals comprising a plurality of channel units, a timing unit, and a transmitting unit; said channel unit including processing section, encoding section and pulse position modulating section; said processing section including input means for coupling a composite waveform thereto, preemphasis means operatively receiving said composite waveform for accentuating crossover points in the composite waveform, clipping means operatively receiving the output of said preemphasis means for infinitely clipping the amplitude portion of said composite waveform and retaining the frequency information therein, pulse generating means operatively coupled to the output of said clipping means for generating pulses corresponding to said crossover points; gate generator means contained within said encoding section and operatively coupled to the output of said pulse generating means for generating gate pulses; buffer circuit means contained within said timing unit operatively connected to the output of said gate generator means for isolating the outputs of said plurality of channel units, sampling means for sampling the outputs of said channel units fed to said buffer circuit means, first coincidence circuit means operatively receiving the output of said buffer circuit means and said sampling means for generating an output pulse when pulses from said summing circuit and said sampling means are coincident therein, channel coding means comprising a delay line operatively receiving pulses from said coincidence circuit means for generating start stop and a plurality of channel pulses corresponding to the number of channel units; second coincidence circuit means operatively receiving pulses from said gate generating means and pulses from said delay line corresponding to the appropriate channel unit for generating an output pulse when pulses from said gate generator and said delay line are coincident therein, blocking oscillator means operatively receiving pulses from the output of said second coincidence circuit means for generating first output pulse which is operatively coupled to said gate generator means for turning off said gate generating means and generating a second pulse; comparator means in said position modulator section and operatively receiving the second output pulse from said blocking oscillator and receiving a signal corresponding to said composite waveform and time modulating said second output pulse from said blocking oscillator wherein the modulation corresponds to the amplitude information of the input waveform; other buffer circuit means contained within said transmitting unit for receiving start-stop pulses from said delay line and time modulated channel pulses from said comparator means wherein said channel pulses are contained between said start-stop pulses, and propagating means operatively receiving the output trains of pulses from said other buffer circuit means for propagating said trains of pulses; said receiver terminal comprising a receiver unit for receiving and detecting trains of pulses; master decoder means operatively receiving trains of pulses from said receiver unit for separating incoming trains of pulses into channels and for generating a time reference pulse; at least one channel decoder means including coincidence means operatively receiving pulses from said master decoder means for determining the presence of information on a particular channel by comparing said reference pulse to individual channel pulses in the coincidence means; at least one reprocessing means operatively receiving pulses from said channel decoder means for converting information applying to a particular channel from pulses to a reproduction of the originating signals; each reprocessing unit including pulse position demodulator means operatively receiving pulses from said channel decoder means for converting time modulation information to a DC voltage which is proportional to the amplitude information; a clipped speech section contained within said audio reprocessing means operatively receiving output pulses from said channel decoder means for recovering the frequency information contained therein; variable amplifier means operatively receiving amplitude information from said pulse position demodulator means and audio frequency information from said clipped speech means for combining said amplitude information and said frequency information thereby improving the naturalness of the output speech and audio output means operatively receiving the output of said variable amplifier means for reproducing said output waveform from said variable amplifier means.

2. A quantized pulse modulated nonsynchronous clipped speech multi-channel coded communications system comprising; at least one transmitter terminal and receiver terminal; said transmitter terminal including, audio processing means for receiving a composite waveform and generating output pulses corresponding to zero crossover points in said composite waveform, gate generating means receiving output pulses from said audio processing means; timing means including, oscillator means for generating output pulses at a desired frequency for sampling the output of said gate generator means, coincidence circuit means receiving pulses from said gate generator means and said oscillator means for generating an output pulse when pulses from said gate generator means and said oscillator means are coincident therein, channel multiplexing means for generating start stop pulses and channel pulses at predetermined time intervals therebetween; other conicidence circuit means operatively receiving output pulses from said gate generator means and output pulses from said multiplexing means corresponding to a channel for generating an output respective pulses when said pulse are coincident therein, pulse generator means receiving output pulses from said second coincidence circuit means for generating a reset pulse which is operatively coupled to said gate generator means for turning off said gate generator and also generating a second output pulse; pulse position modulating means including comparator means receiving said second output pulse corresponding to said zero crossover point from said pulse generating means and said composite wave for time modulating said output pulse from said pulse generating means in accordance with amplitude information in said composite waveform; buffer circuit means receiving said start and stop pulses from said multiplexing means and output pulses from said voltage comparator means so that the output pulses from said voltage comparator means are correctly positioned according to predetermined channels between said start and stop pulses; and radio frequency transmission means for propagating said start stop and channel pulses; said receiver terminal comprising a receiver unit for detecting and producing transmitted pulse train configurations; master decoder means operatively receiving pulse train configurations from said receiver means for separating the incoming pulse train configurations into corresponding channel pulses and for generating a time reference pulse; channel decoder means operatively receiving said channel pulses and said time reference pulse for determining the presence of information on a particular channel by comparing said reference pulse to individual channel pulses; reprocessing means corresponding to said channel decoder means including pulse position demodulator means operatively receiving pulses from said channel decoder means for converting the time modulation information to a potential which is proportional to amplitude information; flip-flop means included in said reprocessing means operatively receiving output pulses from said channel decoder means for recovering amplitude information from said pulses; integrating means operatively receiving the output of said flip-flop means for generating a potential corresponding to frequency information; variable amplifier means operatively receiving said potentials corresponding to amplitude and frequency information and combining said information to improve the naturalness of the subsequent output waveform; and output means operatively receiving the output of said variable amplifier means for reproducing said output waveform.

3. A clipped speech coded pulse communications system comprising transmitter terminals and receiver terminals; said transmitter terminals comprising a plurality of channel units, a timing unit, and a transmitting unit; said channel unit including an audio processing section, encoding section and pulse position modulating section; said audio processing section including input means for coupling a composite waveform thereto, pre-emphasis means for accentuating crossover points present in the composite waveform, clipping means operatively coupled to said pre-emphasis network for infinitely clipping the amplitude portion of said composite waveform and retaining said frequency information contained therein, pulse generating means operatively coupled to the output of said clipping means for generating pulses corresponding to said crossover points; gate generator means contained within said encoding section and operatively coupled to the output of said pulse generating means for generating gate pulses corresponding to input pulses thereto; buffer circuit means contained within said timing unit operatively connected to the output of said gate generator means for isolating the outputs of said plurality of channel units, sampling means for sampling the outputs of said channel units to said buffer circuit means, first coincidence circuit means operatively receiving the output of said buffer circuit means and said sampling means for generating an output pulse when pulses from said buffer circuit and said sampling means are coincident therein, channel coding means operatively receiving pulses from said coincident circuit means for generating start stop and a multiplicity of channel pulses contained between said start and stop pulses; second coincidence circuit means operatively receiving pulses from said gate generating means and pulses from said coding means corresponding to the appropriate channel unit for generating an output pulse when pulses from said gate generator and said coding means are coincident therein, blocking oscillator means included in said pulse position modulating section operatively receiving pulses from the output of said coincidence circuit means for generating a first output pulse which is operatively coupled to said gate generator means for turning off said gate and for generating a second pulse; comparator means included in said pulse position modulator section operatively receiving output pulses from said second blocking oscillator and receiving a signal corresponding to said composite waveform and time modulating said output pulse from said second blocking oscillator through the use of the amplitude information contained within said composite waveform thereby generating an output pulse from said comparator means which is time modulated corresponding to amplitude information; other buffer circuit means contained within said transmitting unit for receiving start and stop pulses from said delay line and time modulated channel pulses from said comparator means wherein said channel pulses are contained between said start and stop framing pulses, and propagating means operatively receiving output trains of pulses from said other buffer circuit means for propagating said trains of pulses; said receiver terminal comprising a receiver unit for receiving and detecting trains of pulses; master decoder means operatively receiving trains of pulses from said receiver unit for separating the incoming trains of pulses into channels and for generating a time reference pulse; a multiplicity of channel decoder units operatively receiving pulses from said master decoder means for determining the presence of information on a particular channel by comparing said reference pulse to individual channel pulses in coincidence means contained therein; a multiplicity of audio reprocessing means corresponding in number to said channel decoder means for converting information applying to a particular channel from pulses to a reproduction of the originating signals; each said audio reprocessing unit including pulse position demodulator means operatively receiving pulses from said channel decoder means for converting said time modulation information to a DC voltage which is proportional to speech amplitude information; a clipped speech section contained within said audio reprocessing means operatively receiving output pulses from said channel decoder means for recovering the infinitely clipped speech information from the time modulated pulses corresponding to the frequency information therein; variable amplifier means operatively receiving audio amplitude information from said pulse position demodulator means and audio frequency information from said clipped speech means for combining said amplitude information and said frequency information thereby improving the naturalness of the output speech, and audio output means operatively receiving the output of said variable amplifier means for reproducing said output waveform.

4. A quantized pulse modulated nonsynchronous clipped speech multi-channel coded communications system comprising; at least one transmitter terminal and receiver terminal; said transmitter terminal including, audio processing means for receiving a composite waveform and generating output pulses corresponding to crossover points in said composite waveform, gate generating means receiving output pulses from audio processing means and generating gate pulses corresponding to said crossover points; timing unit means including, sampling means for sampling the output of said gate generator means, coincidence circuit means receiving pulses from said gate generator means and said sampling means and generating an output pulse when pulses from said gate generator means and said sampling means are coincident therein, channel multiplexing means for generating start and stop pulses and channel pulses at predetermined time intervals therebetween; second coincidence circuit means operatively receiving output pulses from said gate generator means and output pulses from said multiplexing means corresponding to a desired channel for generating an output pulse when said pulses are coincident therein, pulse generator means receiving output pulses from said second coincident circuit means for generating a reset pulse which is operatively coupled to said gate generator means for turning off said gate generator and also generating an output; pulse position modulating means receiving output pulses from said pulse generating means and a signal corresponding to said original composite wave for time modulating said output pulses from said pulse generating means in accordance with amplitude information in said signal; buffer circuit means receiving start and stop pulses from said multiplexing means and output pulses from said pulse position modulating means so that the output pulses from said voltage comparator means are correctly positioned between said start and stop pulses; and radio frequency transmission means for propagating said trains of pulses; said receiver terminal comprising a receiver unit for detecting said transmitted pulse train configurations; master decoder means operatively receiving pulse train configurations from said receiver means for separating incoming pulse train configurations into corresponding channels and for generating a time reference pulse channel decoder means for determining the presence of information on a particular channel by comparing said reference pulse to individual channel pulses; audio reprocessing means corresponding to said channel decoder means including pulse position demodulator means receiving output pulses from said channel decoder means for converting said pulse position modulation information to a DC potential which is proportional to speech amplitude information, clipped speech means included in said audio reprocessing means for recovering the speech information from pulses received from said channel decoder means, amplifier mixing means receiving the output of said pulse position demodulator means corresponding to audio amplitude information and the output of said clipped speech means corresponding to audio frequency information for mixing said outputs therein thereby combining said frequency information and said amplitude information in a form suitable for reproduction.

5. A quantized pulse-modulated nonsynchronous clipped speech multi-channel transmitter terminal comprising; at least one input means for coupling a composite waveform thereto; pulse generating means for generating pulses at zero crossover points in said composite waveform; gate generator means operatively receiving the output pulses from said pulse generating means for generating gate pulses; channel coding means including, sampling means for sampling the output of said gate generator at a predetermined rate, coincidence circuit means operatively receiving output pulses from said gate generator means and said sampling means for generating an output pulse when a sampling and gate pulse are coincident therein, delay means in said channel coding means operatively receiving output pulses from said first coincidence circuit means for generating start stop and channel pulses therebetween; second coincidence circuit means operatively receiving pulses from said gate generator means and an appropriate channel pulse from said delay means for generating an output pulse when said gate generator pulse and channel pulse is coincident therein; pulse modulator means operatively coupled to said input means operatively receiving output pulses from said second coincidence circuit means and said composite waveform for time modulating said pulses from said second coincidence circuit means in accordance with the amplitude of the composite waveform at that time so constructed and arranged that the sampling of said composite waveform occurs at a predetermined time after the output pulse from second coincidence circuit means corresponding to the zero crossover point in said composite waveform is present in said pulse modulator means; and transmitter means operatively receiving modulated pulses from said pulse modulator means including multiplexing means for inserting said modulated pulses in their proper channel position between said start and stop pulses, and propagating means operatively receiving the output of said multiplexing means for propagating trains of pulses comprising start stop and channel pulses contained therebetween.

6. A quantized pulse modulated nonsynchronous clipped speech multi-channel coded transmitter terminal comprising; input means for coupling a composite waveform thereto; clipping means operatively receiving said composite waveform for infinitely clipping the amplitude portion thereof and retaining frequency information therein; pulse generating means operatively receiving the output of said clipper means for generating pulses at zero crossover points in said infinitely clipped waveform; sampling means operatively receiving the output of said pulse generating means for sampling said output at a predetermined frequency; pulse position modulator means operatively receiving the output pulses corresponding to said zero crossover points and said original composite waveform for time modulating said output pulses in accordance with amplitude information in said composite waveform thereby effectively amplitude sampling said original composite waveform at a frequency determined by the sampling of the output pulses corresponding to zero crossover points; channel timing means operatively receiving said sampled output pulses for generating start and stop pulses; transmitter means operatively receiving said start and stop pulses and said time modulated pulses so constructed and arranged that said time modulated channel pulses are inserted between said start and stop pulses.

7. A pulse modulated nonsynchronous clipped speech channel coded communications receiver comprising; a receiver unit for amplifying and detecting trains of pulses containing start stop and channel pulses contained between said start and stop pulses; a master decoder unit operatively receiving output trains of pulses from said receiver unit for separating the incoming trains of pulses into appropriate channel pulse and for generating a time reference pulse; at least one channel decoder unit operatively receiving said channel reference pulse and said time reference pulse so constructed and arranged that said channel reference pulse activates said channel decoder unit when information is present on a channel; at least one audio reprocessing unit including pulse position demodulator means for reclaiming amplitude information contained in said time modulated channel pulse and frequency information recovering means; said pulse position demodulator means operatively receiving time modulated pulse units corresponding to said channel pulse for generating a DC voltage which is proportional to the speech amplitude information contained therein; said frequency information recovery means operatively receiving channel pulses for recovering the speech information from the time modulated pulses corresponding to said channel pulses and producing an output potential corresponding to said frequency information; and audio amplifier means operatively receiving said DC potential corresponding to amplitude information and said potential corresponding to audio frequency information for combining the two potentials in such a manner that substantial duplicate of the original composite waveform is reproduced therein.

8. A pulse modulated nonsynchronous clipped speech multi-channel coded communications receiver terminal comprising; detecting and reproducing means for receiving an original transmitted pulse train configuration wherein said configuration comprises start and stop pulses and time modulated channel pulses contained therebetween; decoder means operatively receiving output pulse train configurations from said detecting and reproducing means for separating said incoming pulse train configurations into channel pulses; at least one channel coincidence means operatively coupled to said decoder means for determining when a channel is present therein and generating an output pulse when a channel is present therein; amplitude information recovery means operatively receiving output pulses from said coincidence means for generating a DC voltage which is proportional to the time modulation of said channel pulse; frequency information recovery means operatively coupled to said channel coincident means for receiving output pulses therefrom and generating a DC potential which is proportional to frequency information contained therein and mixing means operatively receiving said DC voltage corresponding to amplitude information and said potential corresponding to frequency information for combining said outputs corresponding to frequency information and amplitude information generating an output composite waveform which is a substantial duplicate of an original composite waveform.

9. A quantized pulse-modulated nonsynchronous clipped speech multi-channel coded discrete address communications network comprising, at least one transmitter terminal and at least one receiver terminal; said transmitter terminal comprising at least one input terminal for coupling a composite waveform thereto; pulse generating means operatively receiving pulses from said input terminal for generating output pulses at the zero crossover points of said input waveform; sampling means operatively connected to said pulse generator means for sampling said output pulses at a predetermined rate; timing means operatively receiving output pulses from said sampling means corresponding to said sampled output for generating start stop and at least one address pulse therebetween; pulse position modulator means operatively receiving said address pulse from said timing means for position modulating said pulse in accordance with amplitude information in said input waveform and wherein said address pulse determines the optimum sampling point at which the input waveform is amplitude sampled; multiplexing means operatively coupled to said timing means and to said pulse position modulator means for receiving start stop and modulated address pulses from said respective units and inserting said address pulses into proper position between said start stop pulses; transmitter means operatively receiving said trains of start stop and address pulses for transmitting said start stop and address pulses; said receiver terminal comprising means for receiving and detecting said trains of start stop and address pulses; master decoder means operatively coupled to said receiving and detecting means and including coincidence means for determining when a train of start stop and address pulses therebetween contains the address pulse corresponding to the address of the said receiver terminal and for generating an output pulse when the appropriate start stop and address pulse are coincident therein; pulse position demodulator means operatively receiving time modulated output pulses from said coincidence means for extracting the amplitude information corresponding to said time modulation and producing an output DC level corresponding thereto; frequency information recovery means operatively receiving said output pulses from said coincidence means for recovering the frequency information contained therein and generating an output level corresponding to the frequency information; an output mixing means operatively receiving the outputs of said pulse position demodulator means and said frequency information recovery means for mixing said outputs and thereby generating an output composite waveform that approximates an original composite waveform.

10. A quantized pulse-modulated nonsynchronous clipped speech multi-channel coded communications network comprising; at least one transmitter terminal and at least one receiver terminal; said transmitter terminal comprising; at least one input means for coupling a composite waveform thereto; pulse generating means operatively coupled to said intput means for generating pulses corresponding to zero crossover points in the input composite waveform; timing means receiving output pulses from said pulse generating means for generating start stop and address pulses; pulse position modulating means operatively coupled to said timing means and to said input terminal for position time modulating said pulses corresponding to the address pulses by an amount corresponding to the amplitude information in the input composite waveform by said address pulses and wherein said input waveform is amplitude sampled at a time determined and transmitter multiplexing means operatively receiving time modulated pulses and said start and stop pulses for inserting said time modulated pulses at predetermined points between said start and stop pulses so that a predetermined coded train of pulses is generated; said receiver terminal comprising means for receiving and detecting said coded trains of pulses; master decoder means operatively receiving said detected trains of pulses comprising coincidence means responsive to the address of said receiver so that when a train of pulses comprising start stop and address pulses is coincident in said coincidence means an output pulse is generated; pulse position demodulator means operatively coupled to said coincident means and receiving decoded time modulated pulses therefrom for extracting the amplitude information therein and producing an output DC level corresponding to said amplitude information; frequency information recovery means operatively coupled to said coincidence means and receiving output pulses therefrom for extracting frequency information and producing an output potential corresponding thereto; and mixing means operatively receiving the output DC level of said pulse position demodulator means and said potential from said frequency information recovery means for mixing said output levels and producing a composite waveform substantially corresponding to an original composite waveform.

* * * * *